United States Patent
Lavoie

(10) Patent No.: US 10,684,773 B2
(45) Date of Patent: Jun. 16, 2020

(54) MOBILE DEVICE INTERFACE FOR TRAILER BACKUP-ASSIST

(71) Applicant: Ford Global Technologies, LLC, Dearborn, MI (US)

(72) Inventor: Erick Michael Lavoie, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 39 days.

(21) Appl. No.: 15/861,348

(22) Filed: Jan. 3, 2018

(65) Prior Publication Data
US 2019/0205024 A1    Jul. 4, 2019

(51) Int. Cl.
| G06F 3/0488 | (2013.01) |
| G06F 3/041  | (2006.01) |
| B60Q 9/00   | (2006.01) |
| G06F 3/01   | (2006.01) |

(52) U.S. Cl.
CPC ......... *G06F 3/04883* (2013.01); *B60Q 9/005* (2013.01); *G06F 3/017* (2013.01); *G06F 3/0416* (2013.01); *B60R 2300/806* (2013.01); *B60R 2300/8086* (2013.01)

(58) Field of Classification Search
CPC .... G06F 3/04883; G06F 3/017; G06F 3/0416; B60Q 9/005; B60R 2300/806; B60R 2300/8086
See application file for complete search history.

(56) References Cited

U.S. PATENT DOCUMENTS

| 5,959,724 A  | 9/1999  | Izumi     |
| 6,275,754 B1 | 8/2001  | Shimizu   |
| 6,356,828 B1 | 3/2002  | Shimizu   |
| 6,452,617 B1 | 9/2002  | Bates     |
| 6,476,730 B2 | 11/2002 | Kakinami  |
| 6,477,260 B1 | 11/2002 | Shimomura |

(Continued)

FOREIGN PATENT DOCUMENTS

| CN | 101929921 A | 12/2010 |
| CN | 103818204 A | 5/2014  |

(Continued)

OTHER PUBLICATIONS

US 9,772,406 B2, 09/2017, Liu (withdrawn)

(Continued)

*Primary Examiner* — Renee D Chavez
*Assistant Examiner* — Jeremy L Stanley
(74) *Attorney, Agent, or Firm* — Frank Lollo; Eversheds Sutherland (US) LLP

(57) ABSTRACT

Method and apparatus are disclosed for mobile device interface for trailer backup-assist. An example vehicle system includes a vehicle and a mobile device. The mobile device includes a touchscreen, a communication module, and a controller. The controller is to present, via the touchscreen, an interface for trailer backup-assist and detect a swipe when the interface is presented. The controller also is to instruct, via the communication module, the vehicle to move in a direction corresponding to the swipe and continue to instruct the vehicle to move in the direction while detecting a continuous orbital motion extending from the swipe.

20 Claims, 8 Drawing Sheets

(56) References Cited

U.S. PATENT DOCUMENTS

| | | |
|---|---|---|
| 6,657,555 B2 | 12/2003 | Shimizu |
| 6,683,539 B2 | 1/2004 | Trajkovic |
| 6,724,322 B2 | 4/2004 | Tang |
| 6,744,364 B2 | 6/2004 | Wathen |
| 6,768,420 B2 | 7/2004 | McCarthy |
| 6,801,855 B1 | 10/2004 | Walters |
| 6,850,148 B2 | 2/2005 | Masudaya |
| 6,850,844 B1 | 2/2005 | Walters |
| 6,927,685 B2 | 8/2005 | Wathen |
| 6,997,048 B2 | 2/2006 | Komatsu |
| 7,042,332 B2 | 5/2006 | Takamura |
| 7,123,167 B2 | 10/2006 | Staniszewski |
| 7,307,655 B1 | 12/2007 | Okamoto |
| 7,663,508 B2 | 2/2010 | Teshima |
| 7,737,866 B2 | 6/2010 | Wu |
| 7,813,844 B2 | 10/2010 | Gensler |
| 7,825,828 B2 | 11/2010 | Watanabe |
| 7,834,778 B2 | 11/2010 | Browne |
| 7,847,709 B2 | 12/2010 | McCall |
| 7,850,078 B2 | 12/2010 | Christenson |
| 7,924,483 B2 | 4/2011 | Smith |
| 8,035,503 B2 | 10/2011 | Partin |
| 8,054,169 B2 | 11/2011 | Bettecken |
| 8,098,146 B2 | 1/2012 | Petrucelli |
| 8,126,450 B2 | 2/2012 | Howarter |
| 8,164,628 B2 | 4/2012 | Stein |
| 8,180,524 B2 | 5/2012 | Eguchi |
| 8,180,547 B2 | 5/2012 | Prasad |
| 8,224,313 B2 | 7/2012 | Howarter |
| 8,229,645 B2 | 7/2012 | Lee |
| 8,242,884 B2 | 8/2012 | Holcomb |
| 8,335,598 B2 | 12/2012 | Dickerhoof |
| 8,401,235 B2 | 3/2013 | Lee |
| 8,493,236 B2 | 7/2013 | Boehme |
| 8,538,408 B2 | 9/2013 | Howarter |
| 8,542,130 B2 | 9/2013 | Lavoie |
| 8,552,856 B2 | 10/2013 | McRae |
| 8,587,681 B2 | 11/2013 | Guidash |
| 8,594,616 B2 | 11/2013 | Gusikhin |
| 8,599,043 B2 | 12/2013 | Kadowaki |
| 8,618,945 B2 | 12/2013 | Furuta |
| 8,645,015 B2 | 2/2014 | Oetiker |
| 8,655,551 B2 | 2/2014 | Danz |
| 8,692,773 B2 | 4/2014 | You |
| 8,706,350 B2 | 4/2014 | Talty |
| 8,725,315 B2 | 5/2014 | Talty |
| 8,742,947 B2 | 6/2014 | Nakazono |
| 8,744,684 B2 | 6/2014 | Hong |
| 8,780,257 B2 | 7/2014 | Gidon |
| 8,787,868 B2 | 7/2014 | Leblanc |
| 8,825,262 B2 | 9/2014 | Lee |
| 8,933,778 B2 | 1/2015 | Birkel |
| 8,957,786 B2 | 2/2015 | Stempnik |
| 8,994,548 B2 | 3/2015 | Gaboury |
| 8,995,914 B2 | 3/2015 | Nishidai |
| 9,008,860 B2 | 4/2015 | Waldock |
| 9,014,920 B1 | 4/2015 | Torres |
| 9,078,200 B2 | 7/2015 | Wuergler |
| 9,086,879 B2 | 7/2015 | Gautama |
| 9,141,503 B1 | 9/2015 | Chen |
| 9,147,065 B2 | 9/2015 | Lauer |
| 9,154,920 B2 | 10/2015 | O'Brien |
| 9,168,955 B2 | 10/2015 | Noh |
| 9,193,387 B2 | 11/2015 | Auer |
| 9,225,531 B2 | 12/2015 | Hachey |
| 9,230,439 B2 | 1/2016 | Boulay |
| 9,233,710 B2 | 1/2016 | Lavoie |
| 9,273,966 B2 | 3/2016 | Bartels |
| 9,275,208 B2 | 3/2016 | Protopapas |
| 9,283,960 B1 | 3/2016 | Lavoie |
| 9,286,803 B2 | 3/2016 | Tippelhofer |
| 9,302,675 B2 | 4/2016 | Schilling |
| 9,318,022 B2 | 4/2016 | Barth |
| 9,379,567 B2 | 6/2016 | Kracker |
| 9,381,859 B2 | 7/2016 | Nagata |
| 9,429,657 B2 | 8/2016 | Sidhu |
| 9,429,947 B1 | 8/2016 | Wengreen |
| 9,454,251 B1 | 9/2016 | Guihot |
| 9,469,247 B2 | 10/2016 | Juneja |
| 9,493,187 B2 | 11/2016 | Pilutti |
| 9,506,774 B2 * | 11/2016 | Shutko ............... G01C 21/3647 |
| 9,511,799 B2 * | 12/2016 | Lavoie ............... B62D 15/0275 |
| 9,522,675 B1 | 12/2016 | You |
| 9,529,519 B2 | 12/2016 | Blumenberg |
| 9,557,741 B1 | 1/2017 | Elie |
| 9,563,990 B2 | 2/2017 | Khan |
| 9,595,145 B2 | 3/2017 | Avery |
| 9,598,051 B2 | 3/2017 | Okada |
| 9,606,241 B2 | 3/2017 | Varoglu |
| 9,616,923 B2 | 4/2017 | Lavoie |
| 9,637,117 B1 | 5/2017 | Gusikhin |
| 9,651,655 B2 | 5/2017 | Feldman |
| 9,656,690 B2 | 5/2017 | Shen |
| 9,666,040 B2 | 5/2017 | Flaherty |
| 9,688,306 B2 * | 6/2017 | McClain ............... B62D 13/06 |
| 9,701,280 B2 | 7/2017 | Schussmann |
| 9,712,977 B2 | 7/2017 | Tu |
| 9,715,816 B1 | 7/2017 | Adler |
| 9,725,069 B2 | 8/2017 | Krishnan |
| 9,731,714 B2 | 8/2017 | Kiriya |
| 9,731,764 B2 | 8/2017 | Baek |
| 9,754,173 B2 | 9/2017 | Kim |
| 9,809,218 B2 | 11/2017 | Elie |
| 9,811,085 B1 | 11/2017 | Hayes |
| 9,842,444 B2 | 12/2017 | Van Wiemeersch |
| 9,845,070 B2 | 12/2017 | Petel |
| 9,846,431 B2 | 12/2017 | Petel |
| 9,914,333 B2 | 3/2018 | Shank |
| 9,921,743 B2 | 3/2018 | Bryant |
| 9,946,255 B2 | 4/2018 | Matters |
| 9,959,763 B2 | 5/2018 | Miller |
| 9,971,130 B1 | 5/2018 | Lin |
| 9,975,504 B2 | 5/2018 | Dalke |
| 10,019,001 B2 * | 7/2018 | Dang Van Nhan .. B62D 15/027 |
| 10,032,276 B1 | 7/2018 | Liu |
| 10,040,482 B1 | 8/2018 | Jung |
| 10,043,076 B1 | 8/2018 | Zhang |
| 10,131,347 B2 | 11/2018 | Kim |
| 10,192,113 B1 | 1/2019 | Liu |
| 10,246,055 B2 | 4/2019 | Farges |
| 10,268,341 B2 | 4/2019 | Kocienda |
| 2003/0060972 A1 | 3/2003 | Kakinami |
| 2003/0098792 A1 | 5/2003 | Edwards |
| 2003/0133027 A1 | 7/2003 | Itoh |
| 2005/0030156 A1 | 2/2005 | Alfonso |
| 2005/0068450 A1 | 3/2005 | Steinberg |
| 2005/0099275 A1 | 5/2005 | Kamdar |
| 2006/0010961 A1 | 1/2006 | Gibson |
| 2006/0227010 A1 | 10/2006 | Berstis |
| 2006/0235590 A1 | 10/2006 | Bolourchi |
| 2007/0230944 A1 | 10/2007 | Georgiev |
| 2008/0027591 A1 | 1/2008 | Lenser |
| 2008/0154464 A1 | 6/2008 | Sasajima |
| 2008/0154613 A1 | 6/2008 | Haulick |
| 2008/0238643 A1 | 10/2008 | Malen |
| 2008/0306683 A1 | 12/2008 | Ando |
| 2009/0096753 A1 | 4/2009 | Lim |
| 2009/0098907 A1 | 4/2009 | Huntzicker |
| 2009/0115639 A1 | 5/2009 | Proefke |
| 2009/0125181 A1 | 5/2009 | Luke |
| 2009/0125311 A1 | 5/2009 | Haulick |
| 2009/0128315 A1 | 5/2009 | Griesser |
| 2009/0146813 A1 | 6/2009 | Nuno |
| 2009/0174574 A1 | 7/2009 | Endo |
| 2009/0241031 A1 | 9/2009 | Gamaley |
| 2009/0289813 A1 | 11/2009 | Kwiecinski |
| 2009/0309970 A1 * | 12/2009 | Ishii ..................... B60R 1/00 348/143 |
| 2009/0313095 A1 | 12/2009 | Hurpin |
| 2010/0061564 A1 | 3/2010 | Clemow |
| 2010/0114471 A1 | 5/2010 | Sugiyama |
| 2010/0114488 A1 | 5/2010 | Khamharn |
| 2010/0136944 A1 | 6/2010 | Taylor |
| 2010/0152972 A1 | 6/2010 | Attard |

(56) References Cited

U.S. PATENT DOCUMENTS

| | | | |
|---|---|---|---|
| 2010/0156672 A1 | 6/2010 | Yoo | |
| 2010/0245277 A1* | 9/2010 | Nakao | G06F 3/04883 345/173 |
| 2010/0259420 A1 | 10/2010 | Von Rehyer | |
| 2011/0071725 A1 | 3/2011 | Kleve | |
| 2011/0082613 A1 | 4/2011 | Oetiker | |
| 2011/0190972 A1 | 8/2011 | Timmons | |
| 2011/0205088 A1* | 8/2011 | Baker | B60Q 9/006 340/932.2 |
| 2011/0253463 A1 | 10/2011 | Smith | |
| 2011/0309922 A1 | 12/2011 | Ghabra | |
| 2012/0007741 A1 | 1/2012 | Laffey | |
| 2012/0072067 A1 | 3/2012 | Jecker | |
| 2012/0083960 A1 | 4/2012 | Zhu | |
| 2012/0173080 A1 | 7/2012 | Cluff | |
| 2012/0176332 A1* | 7/2012 | Fujibayashi | G06F 3/04847 345/173 |
| 2012/0271500 A1* | 10/2012 | Tsimhoni | B62D 1/28 701/23 |
| 2012/0303258 A1 | 11/2012 | Pampus | |
| 2012/0323643 A1 | 12/2012 | Volz | |
| 2012/0323700 A1 | 12/2012 | Aleksandrovich | |
| 2013/0021171 A1 | 1/2013 | Hsu | |
| 2013/0024202 A1 | 1/2013 | Harris | |
| 2013/0043989 A1 | 2/2013 | Niemz | |
| 2013/0073119 A1 | 3/2013 | Huger | |
| 2013/0109342 A1 | 5/2013 | Welch | |
| 2013/0110342 A1 | 5/2013 | Wuttke | |
| 2013/0113936 A1 | 5/2013 | Cohen | |
| 2013/0124061 A1 | 5/2013 | Khanafer | |
| 2013/0145441 A1 | 6/2013 | Mujumdar | |
| 2013/0211623 A1 | 8/2013 | Thompson | |
| 2013/0231824 A1 | 9/2013 | Wilson | |
| 2013/0289825 A1 | 10/2013 | Noh | |
| 2013/0314502 A1 | 11/2013 | Urbach | |
| 2013/0317944 A1 | 11/2013 | Huang | |
| 2014/0052323 A1 | 2/2014 | Reichel | |
| 2014/0095994 A1 | 4/2014 | Kim | |
| 2014/0096051 A1 | 4/2014 | Boblett | |
| 2014/0121930 A1 | 5/2014 | Allexi | |
| 2014/0147032 A1 | 5/2014 | Yous | |
| 2014/0156107 A1* | 6/2014 | Karasawa | G01C 21/3664 701/1 |
| 2014/0188339 A1 | 7/2014 | Moon | |
| 2014/0222252 A1 | 8/2014 | Matters | |
| 2014/0240502 A1 | 8/2014 | Strauss | |
| 2014/0282931 A1 | 9/2014 | Protopapas | |
| 2014/0297120 A1* | 10/2014 | Cotgrove | B60T 8/17552 701/41 |
| 2014/0300504 A1 | 10/2014 | Shaffer | |
| 2014/0303839 A1 | 10/2014 | Filev | |
| 2014/0320318 A1 | 10/2014 | Victor | |
| 2014/0327736 A1 | 11/2014 | DeJohn | |
| 2014/0350804 A1 | 11/2014 | Park | |
| 2014/0350855 A1 | 11/2014 | Vishnuvajhala | |
| 2014/0365108 A1 | 12/2014 | You | |
| 2014/0365126 A1 | 12/2014 | Vulcano | |
| 2015/0022468 A1 | 1/2015 | Cha | |
| 2015/0039173 A1 | 2/2015 | Beaurepaire | |
| 2015/0039224 A1 | 2/2015 | Tuukkanen | |
| 2015/0048927 A1 | 2/2015 | Simmons | |
| 2015/0066545 A1 | 3/2015 | Kotecha | |
| 2015/0077522 A1 | 3/2015 | Suzuki | |
| 2015/0088360 A1 | 3/2015 | Bonnet | |
| 2015/0091741 A1 | 4/2015 | Stefik | |
| 2015/0109116 A1 | 4/2015 | Grimm | |
| 2015/0116079 A1 | 4/2015 | Mishra | |
| 2015/0123818 A1 | 5/2015 | Sellschopp | |
| 2015/0127208 A1* | 5/2015 | Jecker | B62D 15/025 701/23 |
| 2015/0149265 A1 | 5/2015 | Huntzicker | |
| 2015/0151789 A1 | 6/2015 | Lee | |
| 2015/0153178 A1 | 6/2015 | Koo | |
| 2015/0161890 A1 | 6/2015 | Huntzicker | |
| 2015/0163649 A1 | 6/2015 | Chen | |
| 2015/0197278 A1* | 7/2015 | Boos | G05D 1/0044 701/2 |
| 2015/0203111 A1 | 7/2015 | Bonnet | |
| 2015/0203156 A1* | 7/2015 | Hafner | B62D 13/06 701/36 |
| 2015/0210317 A1* | 7/2015 | Hafner | B62D 13/06 701/41 |
| 2015/0217693 A1* | 8/2015 | Pliefke | B60R 1/00 348/118 |
| 2015/0219464 A1 | 8/2015 | Beaurepaire | |
| 2015/0220791 A1 | 8/2015 | Wu | |
| 2015/0226146 A1 | 8/2015 | Elwart | |
| 2015/0274016 A1 | 10/2015 | Kinoshita | |
| 2015/0286340 A1 | 10/2015 | Send | |
| 2015/0329110 A1 | 11/2015 | Stefan | |
| 2015/0344028 A1 | 12/2015 | Gieseke | |
| 2015/0346727 A1 | 12/2015 | Ramanujam | |
| 2015/0360720 A1 | 12/2015 | Li | |
| 2015/0365401 A1 | 12/2015 | Brown | |
| 2015/0371541 A1 | 12/2015 | Korman | |
| 2015/0375741 A1* | 12/2015 | Kiriya | G06K 9/00355 701/2 |
| 2015/0375742 A1 | 12/2015 | Gebert | |
| 2016/0012653 A1 | 1/2016 | Soroka | |
| 2016/0012726 A1 | 1/2016 | Wang | |
| 2016/0018821 A1 | 1/2016 | Akita | |
| 2016/0055749 A1 | 2/2016 | Nicoll | |
| 2016/0153778 A1 | 2/2016 | Singh | |
| 2016/0062354 A1* | 3/2016 | Li | B62D 59/04 701/2 |
| 2016/0068158 A1* | 3/2016 | Elwart | B60W 10/00 701/41 |
| 2016/0068187 A1 | 3/2016 | Hata | |
| 2016/0075369 A1 | 3/2016 | Lavoie | |
| 2016/0090055 A1 | 3/2016 | Breed | |
| 2016/0107689 A1 | 4/2016 | Lee | |
| 2016/0112846 A1 | 4/2016 | Siswick | |
| 2016/0117926 A1 | 4/2016 | Akavaram | |
| 2016/0127664 A1 | 5/2016 | Bruder | |
| 2016/0139244 A1 | 5/2016 | Holtman | |
| 2016/0144857 A1 | 5/2016 | Ohshima | |
| 2016/0152263 A1* | 6/2016 | Singh | B60T 8/1708 701/41 |
| 2016/0170494 A1 | 6/2016 | Bonnet | |
| 2016/0185389 A1 | 6/2016 | Ishijima | |
| 2016/0189435 A1 | 6/2016 | Beaurepaire | |
| 2016/0207528 A1 | 7/2016 | Stefan | |
| 2016/0224025 A1* | 8/2016 | Petel | B62D 15/0285 |
| 2016/0229452 A1* | 8/2016 | Lavoie | B62D 13/06 |
| 2016/0236680 A1 | 8/2016 | Lavoie | |
| 2016/0249294 A1 | 8/2016 | Lee | |
| 2016/0257304 A1 | 9/2016 | Lavoie | |
| 2016/0271792 A1* | 9/2016 | Yui | G06F 3/0488 |
| 2016/0272244 A1 | 9/2016 | Imai | |
| 2016/0282442 A1 | 9/2016 | O'Mahony | |
| 2016/0284217 A1 | 9/2016 | Lee | |
| 2016/0288657 A1 | 10/2016 | Tokura | |
| 2016/0300417 A1 | 10/2016 | Hatton | |
| 2016/0304087 A1 | 10/2016 | Noh | |
| 2016/0304088 A1 | 10/2016 | Barth | |
| 2016/0349362 A1 | 10/2016 | Rohr | |
| 2016/0321445 A1 | 11/2016 | Turgeman | |
| 2016/0321926 A1 | 11/2016 | Mayer | |
| 2016/0334797 A1 | 11/2016 | Ross | |
| 2016/0347280 A1 | 12/2016 | Daman | |
| 2016/0355125 A1 | 12/2016 | Herbert | |
| 2016/0355354 A1 | 12/2016 | Chen | |
| 2016/0358474 A1 | 12/2016 | Uppal | |
| 2016/0368489 A1 | 12/2016 | Aich | |
| 2016/0371607 A1 | 12/2016 | Rosen | |
| 2016/0371691 A1 | 12/2016 | Kang | |
| 2017/0001650 A1 | 1/2017 | Park | |
| 2017/0008563 A1* | 1/2017 | Popken | G08G 1/168 |
| 2017/0026198 A1 | 1/2017 | Ochiai | |
| 2017/0028985 A1 | 2/2017 | Kiyokawa | |
| 2017/0030722 A1 | 2/2017 | Kojo | |
| 2017/0032593 A1 | 2/2017 | Patel | |

(56) References Cited

U.S. PATENT DOCUMENTS

| | | | |
|---|---|---|---|
| 2017/0052697 A1* | 2/2017 | Han | G06F 3/0485 |
| 2017/0072947 A1 | 3/2017 | Lavoie | |
| 2017/0073004 A1* | 3/2017 | Shepard | B62D 15/028 |
| 2017/0076603 A1 | 3/2017 | Bostick | |
| 2017/0097504 A1 | 4/2017 | Takamatsu | |
| 2017/0116790 A1 | 4/2017 | Kusens | |
| 2017/0123423 A1 | 5/2017 | Sako | |
| 2017/0129537 A1 | 5/2017 | Kim | |
| 2017/0129538 A1 | 5/2017 | Stefan | |
| 2017/0132482 A1 | 5/2017 | Kim | |
| 2017/0144654 A1 | 5/2017 | Sham | |
| 2017/0144656 A1 | 5/2017 | Kim | |
| 2017/0147995 A1 | 5/2017 | Kalimi | |
| 2017/0168479 A1 | 6/2017 | Dang | |
| 2017/0192428 A1 | 7/2017 | Vogt | |
| 2017/0200369 A1 | 7/2017 | Miller | |
| 2017/0203763 A1 | 7/2017 | Yamada | |
| 2017/0208438 A1 | 7/2017 | Dickow | |
| 2017/0297385 A1 | 10/2017 | Kim | |
| 2017/0297620 A1 | 10/2017 | Lavoie | |
| 2017/0301241 A1 | 10/2017 | Urhahne | |
| 2017/0308075 A1 | 10/2017 | Whitaker | |
| 2017/0336788 A1* | 11/2017 | Iagnemma | G05D 1/0038 |
| 2017/0336926 A1* | 11/2017 | Chaudhri | G06F 3/04817 |
| 2017/0357317 A1 | 12/2017 | Chaudhri | |
| 2017/0371514 A1 | 12/2017 | Cullin | |
| 2018/0015878 A1 | 1/2018 | McNew | |
| 2018/0024559 A1 | 1/2018 | Seo | |
| 2018/0029591 A1 | 2/2018 | Lavoie | |
| 2018/0029641 A1 | 2/2018 | Solar | |
| 2018/0039264 A1 | 2/2018 | Messner | |
| 2018/0043884 A1 | 2/2018 | Johnson | |
| 2018/0056939 A1 | 3/2018 | van Roermund | |
| 2018/0056989 A1 | 3/2018 | Donald | |
| 2018/0082588 A1 | 3/2018 | Hoffman, Jr. | |
| 2018/0088330 A1 | 3/2018 | Giannuzzi | |
| 2018/0093663 A1 | 4/2018 | Kim | |
| 2018/0105165 A1 | 4/2018 | Alarcon | |
| 2018/0105167 A1 | 4/2018 | Kim | |
| 2018/0148094 A1 | 5/2018 | Mukaiyama | |
| 2018/0174460 A1 | 6/2018 | Jung | |
| 2018/0189971 A1 | 7/2018 | Hildreth | |
| 2018/0194344 A1 | 7/2018 | Wang | |
| 2018/0196963 A1 | 7/2018 | Bandiwdekar | |
| 2018/0224863 A1 | 8/2018 | Fu | |
| 2018/0236957 A1 | 8/2018 | Min | |
| 2018/0284802 A1 | 10/2018 | Tsai | |
| 2018/0286072 A1 | 10/2018 | Tsai | |
| 2018/0339654 A1 | 11/2018 | Kim | |
| 2018/0345851 A1 | 12/2018 | Lavoie | |
| 2018/0364731 A1 | 12/2018 | Liu | |
| 2019/0005445 A1 | 1/2019 | Bahrainwala | |
| 2019/0042003 A1 | 2/2019 | Parazynski | |
| 2019/0066503 A1 | 2/2019 | Li | |
| 2019/0103027 A1 | 4/2019 | Wheeler | |
| 2019/0137990 A1 | 5/2019 | Golgiri | |

FOREIGN PATENT DOCUMENTS

| | | |
|---|---|---|
| CN | 104183153 A | 12/2014 |
| CN | 104485013 A | 4/2015 |
| CN | 104691544 A | 6/2015 |
| CN | 103049159 B | 7/2015 |
| CN | 105588563 A | 5/2016 |
| CN | 105599703 A | 5/2016 |
| CN | 105774691 A | 7/2016 |
| CN | 106027749 A | 10/2016 |
| CN | 205719000 U | 11/2016 |
| CN | 106598630 A | 4/2017 |
| CN | 106782572 A | 5/2017 |
| CN | 106945662 A | 7/2017 |
| CN | 104290751 B | 1/2018 |
| DE | 3844340 A1 | 7/1990 |
| DE | 19817142 A1 | 10/1999 |
| DE | 19821163 A1 | 11/1999 |
| DE | 102005006966 A1 | 9/2005 |
| DE | 102006058213 A1 | 7/2008 |
| DE | 102009024083 A1 | 7/2010 |
| DE | 102016224529 A1 | 3/2011 |
| DE | 102016226008 A1 | 3/2011 |
| DE | 102009060169 A1 | 6/2013 |
| DE | 102011080148 A1 | 7/2013 |
| DE | 102012200725 A1 | 9/2013 |
| DE | 102009051055 A1 | 10/2013 |
| DE | 102010034129 B4 | 10/2013 |
| DE | 102011122421 A1 | 6/2014 |
| DE | 102012008858 A1 | 6/2014 |
| DE | 102013016342 A1 | 1/2015 |
| DE | 102013019904 A1 | 2/2015 |
| DE | 102013016342 A1 | 4/2015 |
| DE | 102012222972 A1 | 5/2015 |
| DE | 102013019771 A1 | 12/2015 |
| DE | 102013213064 A1 | 2/2016 |
| DE | 102014007915 A1 | 2/2016 |
| DE | 102014011802 A1 | 2/2016 |
| DE | 102014009077 A1 | 4/2016 |
| DE | 102014226458 A1 | 6/2016 |
| DE | 102014011864 A1 | 12/2016 |
| DE | 102014015655 A1 | 5/2017 |
| DE | 102014111570 A1 | 6/2017 |
| DE | 102016214433 A1 | 6/2017 |
| DE | 102015209976 A1 | 7/2017 |
| DE | 102015221224 A1 | 12/2017 |
| DE | 102016011916 A1 | 2/2018 |
| DE | 102016125282 A1 | 6/2018 |
| DE | 102016211021 A1 | 6/2018 |
| EP | 2653367 A1 | 6/2000 |
| EP | 2768718 B1 | 6/2011 |
| EP | 2289768 A2 | 10/2013 |
| EP | 2620351 B1 | 12/2015 |
| EP | 2295281 A1 | 3/2016 |
| EP | 2135788 B1 | 6/2016 |
| FR | 3021798 A1 | 12/2012 |
| GB | 2344481 A1 | 12/2012 |
| GB | 2497836 A | 9/2014 |
| GB | 2517835 A | 5/2016 |
| GB | 2491720 A | 7/2016 |
| JP | 5586450 B2 | 5/2004 |
| JP | 5918683 B2 | 10/2004 |
| JP | 2000293797 A | 7/2005 |
| JP | 2004142543 A | 4/2009 |
| JP | 2016119032 A | 4/2009 |
| JP | 2018052188 A | 1/2010 |
| JP | 2004287884 A | 7/2014 |
| JP | 2005193742 A | 7/2014 |
| JP | 2009090850 A | 6/2016 |
| JP | 2014134082 A | 7/2016 |
| JP | 2014125196 A | 4/2018 |
| KR | 20130106005 A | 6/2006 |
| KR | 20160039460 A | 5/2008 |
| KR | 20160051993 A | 1/2010 |
| KR | 10164167 B | 9/2013 |
| KR | 20090040024 A | 4/2016 |
| KR | 20100006714 A | 5/2016 |
| WO | WO 2017125514 A1 | 7/1917 |
| WO | WO 2017/112444 A1 | 12/2010 |
| WO | WO 2017/118510 A1 | 6/2011 |
| WO | WO 2006/064544 A1 | 11/2011 |
| WO | WO 2017/125514 A1 | 1/2013 |
| WO | WO 2008/055567 A1 | 4/2013 |
| WO | WO 2010/006981 A1 | 8/2013 |
| WO | WO 2011/141096 A1 | 7/2014 |
| WO | WO 2013/056959 A1 | 5/2015 |
| WO | WO 2013/123813 A1 | 5/2015 |
| WO | WO 2014/103492 A1 | 3/2016 |
| WO | WO 2015/068032 A1 | 8/2016 |
| WO | WO 2015/193058 A1 | 9/2016 |
| WO | WO 2016/046269 A1 | 4/2017 |
| WO | WO 2016/128200 A1 | 5/2017 |
| WO | WO 2016/134822 A1 | 6/2017 |
| WO | WO 2017/062448 A1 | 6/2017 |
| WO | WO 2017/073159 A1 | 6/2017 |
| WO | WO 2017/096307 A1 | 6/2017 |
| WO | WO 2017/096728 A1 | 7/2017 |

(56) References Cited

FOREIGN PATENT DOCUMENTS

OTHER PUBLICATIONS

Alberto Broggi and Elena Cardarelli, Vehicle Detection for Autonomous Parking Using a Soft-Cascade ADA Boost Classifier, Jun. 8, 2014.
Al-Sherbaz, Ali et al., Hybridisation of GNSS with other wireless/sensors technologies on board smartphones to offer seamless outdoors-indoors positioning for LBS applications, Apr. 2016, 3 pages.
Automatically Into the Parking Space—https://www.mercedes-benz.com/en/mercedes- benz/next/automation/automatically-into-the-parking-space/; Oct. 27, 2014.
Bill Howard, Bosch's View of the Future Car: Truly Keyless Entry, Haptic Feedback, Smart Parking, Cybersecurity, Jan. 9, 2017, 8 Pages.
ChargeItSpot Locations, Find a Phone Charging Station Near You, retrieved at https://chargeitspot.com/locations/ on Nov. 28, 2017.
Core System Requirements Specification (SyRS), Jun. 30, 2011, Research and Innovative Technology Administration.
Daimler AG, Remote Parking Pilot, Mar. 2016 (3 Pages).
Jingbin Liu, IParking: An Intelligent Indoor Location-Based Smartphone Parking Service, Oct. 31, 2012, 15 pages.
Land Rover develops a smartphone remote control for its SUVs, James Vincent, Jun. 18, 2015.
Land Rover, Land Rover Remote Control via Iphone RC Range Rover Sport Showcase—Autogefühl, Retrieved from https://www.youtube.com/watch?v=4ZaaYNaEFio (at 43 seconds and 1 minute 42 seconds), Sep. 16, 2015.
Perpendicular Parking—https://prezi.com/toqmfyxriksl/perpendicular-parking/.
SafeCharge, Secure Cell Phone Charging Stations & Lockers, retrieved at https://www.thesafecharge.com on Nov. 28, 2017.
Search Report dated Jan. 19, 2018 for GB Patent Application No. 1711988.4 (3 pages).
Search Report dated Jul. 11, 2017 for GB Patent Application No. Enter 15/583,524, pp. 3.
Search Report dated May 21, 2018 for Great Britain Patent Application No. GB 1800277.4 (5 Pages).
Search Report dated Nov. 22, 2018 for GB Patent Application No. GB 1809829.3 (6 pages).
Search Report dated Nov. 27, 2018 for GB Patent Application No. GB 1809112.4 (3 pages).
Search Report dated Nov. 28, 2017, for GB Patent Application No. GB 1710916.6 (4 Pages).
Search Report dated Nov. 28, 2018 for GB Patent Application No. GB 1809842.6 (5 pages).
Search Report dated Oct. 10, 2018 for GB Patent Application No. 1806499.8 (4 pages).
Tesla Model S Owner's Manual v2018.44. Oct. 29, 2018.
Vehicle's Orientation Measurement Method by Single-Camera Image Using Known-Shaped Planar Object, Nozomu Araki, Takao Sato, Yasuo Konishi and Hiroyuki Ishigaki, 2010.

* cited by examiner

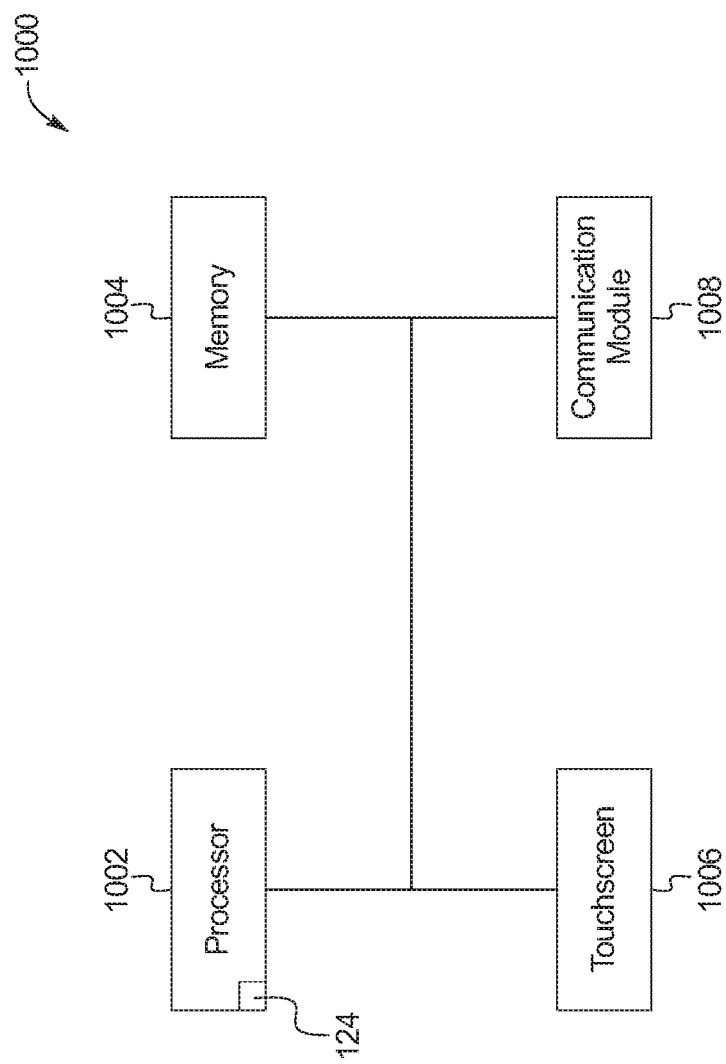

MOBILE DEVICE INTERFACE FOR TRAILER BACKUP-ASSIST

TECHNICAL FIELD

The present disclosure generally relates to trailers and, more specifically, to mobile device interface for trailer backup-assist.

BACKGROUND

Many vehicles include functions in which at least some motive functions of a vehicle are autonomously and/or semi-autonomously controlled by the vehicle. For example, some vehicles include cruise control features (e.g., adaptive cruise control features) in which the vehicle controls acceleration and/or deceleration of the vehicle so that a speed of the vehicle is maintained. Some vehicles include park-assist features in which the vehicle autonomously and/or semi-autonomously controls motive functions of the vehicle to park the vehicle into a parking spot. Further, some vehicles include trailer backup-assist features in which the vehicle autonomously and/or semi-autonomously controls motive functions of the vehicle to back a trailer coupled to the vehicle to a desired position.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for mobile device interface for trailer backup-assist. An example disclosed vehicle system includes a vehicle and a mobile device. The mobile device includes a touchscreen, a communication module, and a controller. The controller is to present, via the touchscreen, an interface for trailer backup-assist and detect a swipe when the interface is presented. The controller also is to instruct, via the communication module, the vehicle to move in a direction corresponding to the swipe and continue to instruct the vehicle to move in the direction while detecting a continuous orbital motion extending from the swipe.

In some examples, the vehicle includes a hitch, a hitch sensor for monitoring the hitch, and a second communication module for wireless communication with the communication module of the mobile device. In some such examples, the controller presents the interface for the trailer backup-assist in response to receiving a signal indicating that the hitch sensor detects a trailer is coupled to the hitch of the vehicle. In some such examples, the controller presents a second interface for remote park-assist in response to receiving a signal indicating that the hitch sensor detects a trailer is not coupled to the hitch of the vehicle. In some such examples, the vehicle includes an autonomy unit and the controller instructs the autonomy unit to perform the trailer backup-assist in response to detecting a user input when the interface is presented.

An example disclosed method includes presenting, via a touchscreen of a mobile device, an interface for trailer backup-assist and detecting a swipe on the touchscreen when the interface is presented. The example disclosed method also includes instructing, via a communication module of the mobile device, a vehicle to move in a direction corresponding to the swipe and continuing to instruct the vehicle to move in the direction while detecting a continuous orbital motion extending from the swipe.

In some examples, the interface is presented in response to receiving a signal indicating that a trailer is coupled to the vehicle. Some examples further include instructing the vehicle to stop moving in response to detecting that at least one of the continuous orbital motion has stopped and the swipe has stopped before transitioning to the continuous orbital motion. Some examples further include instructing the vehicle to adjust a vehicle speed in response to detecting a change in speed of the continuous orbital motion. Some examples further include instructing the vehicle to adjust a turning radius in response to detecting a change in radius of the continuous orbital motion. In some examples, instructing the vehicle to move includes instructing straight forward movement in response to detecting an upward swipe, straight reverse movement in response to detecting a downward swipe, a left turn in response to detecting a leftward swipe, and a right turn in response to detecting a rightward swipe.

Some examples further include presenting, via the touchscreen, a second interface for remote park-assist in response to receiving a signal indicating that a trailer is not coupled to the vehicle. Some such examples further include instructing an autonomy unit of the vehicle to perform the remote park-assist in response to detecting a user input when the second interface is presented.

Some examples further include instructing the vehicle to stop moving in response to detecting that the continuous orbital motion is outside of a motion track of the interface. Some such examples further include defining the motion track based upon a plurality of motion paths received from a user via the touchscreen.

An example disclosed tangible computer readable medium includes instructions which, when executed, cause a machine to present, via a touchscreen, an interface for trailer backup-assist and detect a swipe on the touchscreen when the interface is presented. The instructions which, when executed, also cause the machine to instruct, via a communication module, a vehicle to move in a direction corresponding to the swipe and continue to instruct the vehicle to move in the direction while detecting a continuous orbital motion extending from the swipe.

In some examples, the instructions, when executed, cause the machine to present the interface in response to receiving a signal indicating that a trailer is coupled to the vehicle. In some examples, the instructions, when executed, further cause the machine to instruct the vehicle to stop moving in response to detecting that at least one of the continuous orbital motion has stopped and the swipe has stopped before transitioning to the continuous orbital motion. In some examples, the instructions, when executed, further cause the machine to adjust a vehicle speed in response to detecting a change in speed of the continuous orbital motion. In some examples, the instructions, when executed, further cause the machine to adjust a turning radius in response to detecting a change in radius of the continuous orbital motion.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIG. 10 is a block diagram of electronic components of the mobile device of FIG. 1.

DETAILED DESCRIPTION OF EXAMPLE EMBODIMENTS

Figure 1:
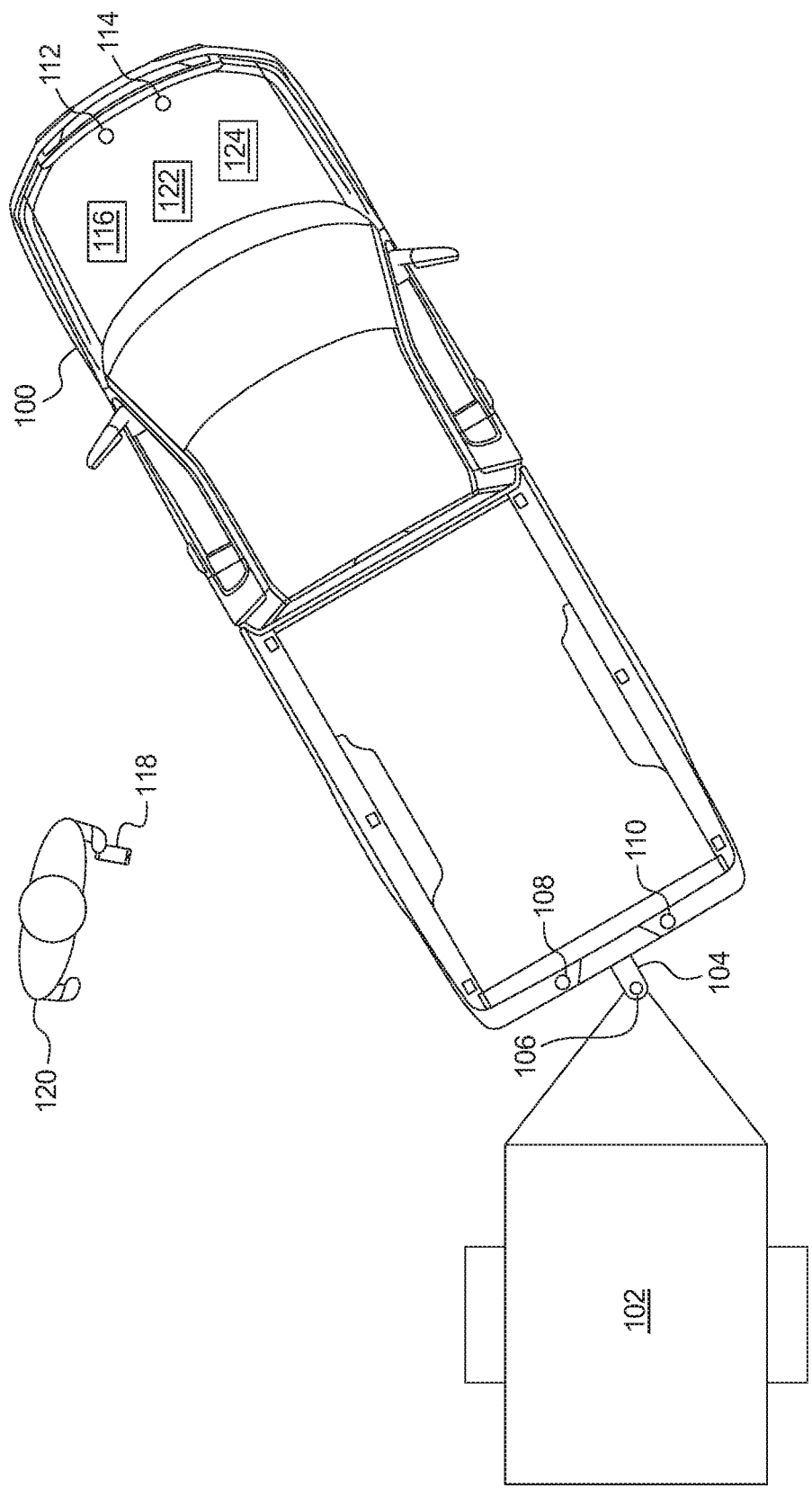
FIG. 1 illustrates an example mobile device utilized for trailer backup-assist for a vehicle and a trailer in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Many vehicles include functions in which at least some motive functions of a vehicle are autonomously and/or semi-autonomously controlled by the vehicle. For example, some vehicles include cruise control features (e.g., adaptive cruise control features) in which the vehicle controls acceleration and/or deceleration of the vehicle so that a speed of the vehicle is maintained. Some vehicles include park-assist features in which the vehicle autonomously and/or semi-autonomously controls motive functions of the vehicle to park the vehicle into a parking spot. Further, some vehicles include trailer backup-assist features in which the vehicle autonomously and/or semi-autonomously controls motive functions of the vehicle to back a trailer coupled to the vehicle to a desired position.

Some park-assist and trailer backup-assist systems are remote systems in which the vehicle autonomously and/or semi-autonomously performs motive functions of the vehicle when an operator (e.g., a driver of the vehicle has already exited from a cabin of the vehicle. For instance, a remote park-assist system enables the operator to exit the vehicle before the vehicle is parked in a small parking spot (e.g., from which the operator may have difficulty exiting the cabin of the vehicle). A remote trailer backup-assist system may enable the operator to clearly monitor the vehicle and the trailer as the vehicle backs the trailer into a desired location. In some instances, a vehicle potentially may continue to autonomously and/or semi-autonomously perform motive functions of the vehicle when doing so is undesired. For instance, a vehicle potentially may perform motive functions for too long a period after the operator presses a button on a mobile device to initiate the motive functions. Further, a vehicle potentially may continue to perform motive functions in an undesired manner if there is lag in communication between the mobile device and the vehicle.

Example methods and apparatus disclosed herein include a remote trailer backup-assist system that is configured to autonomously perform motive functions of the vehicle when a trailer is coupled to a vehicle. Further, some examples methods and apparatus disclosed herein include a remote park-assist system that is configured to autonomously perform motive functions of the vehicle when a trailer is not coupled to a vehicle. To prevent the vehicle from autonomously performing motive functions when a user does not intend to utilize such functions, the systems disclosed herein instruct the vehicle to move as long as a continuous motion input is being received by a mobile device of the user.

Examples disclosed herein include a remote trailer backup-assist system for controlling a vehicle while a trailer is attached. The system includes an application (also referred to as an app) operating on a mobile device that is utilized by an operator of the vehicle to control motive functions of the vehicle when the trailer is coupled to the vehicle. The system causes the vehicle to perform motive functions in response to the operator providing a continuous motion input via a touchscreen of the mobile device. For example, the vehicle moves forward in a straight path if the user swipes upward and continues in a circular motion, moves in reverse in a straight path if the user swipes downward and continues in a circular motion, turns to the right if the user swipes rightward and continues in a circular motion, and turns to the left if the user swipes leftward and continues in a circular motion. In some examples, the vehicle adjusts a turning radius upon the operator adjusting a radius of the circular motion on the touchscreen of the mobile device and/or adjusts a vehicle speed upon the operator adjusting a speed of the circular motion on the touchscreen of the mobile device.

As used herein, "trailer backup-assist" refers to a system in which a vehicle performs autonomous and/or semi-autonomous motive functions while a trailer is coupled to the vehicle to enable the vehicle to back up the trailer into a desired position (e.g., identified via user input). As used herein, "trailer backup-assist" refers to a system that is initiated and partially controlled by a driver located outside of a vehicle in which the vehicle performs autonomous and/or semi-autonomous motive functions while a trailer is coupled to the vehicle to enable the vehicle to back up the trailer to a desired position (e.g., identified via user input).

As used herein, "remote parking," "vehicle remote park-assist," "remote park-assist," and "RePA" refer to a vehicle controlling motive functions of the vehicle without direct steering or velocity input from a driver to autonomously park the vehicle into a parking spot while the driver is located outside of the vehicle. For example, a remote park assist-system of an autonomy unit controls the motive functions of the vehicle upon initiation from a driver to remotely park the vehicle into a parking spot.

Turning to the figures, FIG. 1 illustrates an example vehicle 100 and an example trailer 102 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be semi-autonomous (e.g., some routine motive functions controlled by the vehicle 100) or autonomous (e.g., motive functions are controlled by the vehicle 100 without direct driver input).

In the illustrated example, the vehicle 100 includes a hitch 104 that enables the trailer 102 to couple to the vehicle 100. The trailer 102 couples to the vehicle 100 via the hitch 104 to transport object(s) from one location to another location. For example, the trailer 102 is utilized to transport object(s) when storage areas (e.g., trunks, flatbeds, back seats, etc.) within the vehicle 100 are unable to contain to those object(s). The hitch 104 (also referred to as a tow hitch, a tow bar, a trailer hitch, etc.) of the illustrated example is located towards the rear of the vehicle 100. For example, the hitch 104 is coupled to and/or extends from a chassis of the vehicle 100. The hitch 104 is configured to receive a trailer connector of the trailer 102 to couple the trailer 102 to the vehicle 100. In other words, the hitch 104 enables the vehicle 100 to tow the trailer 102.

The vehicle 100 of the illustrated example includes a hitch sensor 106, a proximity sensor 108, a camera 110, a proximity sensor 112, and a camera 114. The hitch sensor 106 detects when the trailer 102 is coupled to the hitch 104 of the vehicle 100. For example, the hitch sensor 106 is a capacitive sensor, a piezoelectric sensor, a magnetoelastic sensor, and/or any other sensor configured to detect a coupling of the trailer 102 to the hitch 104. The proximity sensor 108, the camera 110, the proximity sensor 112, and the camera 114 are sensing devices that monitor a surrounding area of the vehicle 100. In the illustrated example, the proximity sensor 108 (also referred to as a rear proximity sensor) and the camera 110 (also referred to as a rear camera) are rear sensing devices that monitor an area and/or object(s) (e.g., the trailer 102) behind the vehicle 100. The proximity sensor 112 (also referred to as a front proximity sensor) and the camera 114 (also referred to as a front camera) are rear sensing devices that monitor an area and/or object(s) in front of the vehicle 100. For example, the proximity sensor 108 is configured to detect a presence of, a relative location of, and/or a distance to object(s) positioned behind the vehicle 100. The camera 110 is configured to capture image(s) and/or video that are utilized to detect a presence of, a relative location of, and/or a distance to object(s) positioned behind the vehicle 100. The proximity sensor 112 is configured to detect a presence of, a relative location of, and/or a distance to object(s) positioned in front of the vehicle 100. Further, the camera 114 is configured to capture image(s) and/or video that are utilized to detect a presence of, a relative location of, and/or a distance to object(s) positioned in front of the vehicle 100.

The vehicle 100 of the illustrated example also includes a communication module 116. For example, the communication module 116 includes wired or wireless network interfaces to enable communication with other devices and/or external networks. The external network(s) may be a public network, such as the Internet; a private network, such as an intranet; or combinations thereof, and may utilize a variety of networking protocols now available or later developed including, but not limited to, TCP/IP-based networking protocols. The communication module 116 also includes hardware (e.g., processors, memory, storage, antenna, etc.) and software to control the wired or wireless network interfaces. For example, the communication module 116 includes one or more communication controllers for cellular networks, such as Global System for Mobile Communications (GSM), Universal Mobile Telecommunications System (UMTS), Long Term Evolution (LTE), Code Division Multiple Access (CDMA).

In the illustrated example, the communication module 116 includes hardware and firmware to establish a wireless connection with mobile device 118 (e.g., a smart phone, a wearable, a smart watch, a tablet, etc.) of a user 120 (e.g., an operator, such as a driver) of the vehicle 100. For example, the communication module 116 is a wireless personal area network (WPAN) module that wirelessly communicates with key fob(s) and/or mobile device(s) of user(s) (e.g., the mobile device 118 of the user 120) via short-range wireless communication protocol(s). In some examples, the communication module 116 implements the Bluetooth® and/or Bluetooth® Low Energy (BLE) protocols. The Bluetooth® and BLE protocols are set forth in Volume 6 of the Bluetooth® Specification 4.0 (and subsequent revisions) maintained by the Bluetooth® Special Interest Group. Additionally or alternatively, the communication module 116 is configured to wirelessly communicate via Wi-Fi®, Near Field Communication (NFC), UWB (Ultra-Wide Band), and/or any other short-range and/or local wireless communication protocol (e.g., IEEE 802.11a/b/g/n/ac) that enables the communication module 116 to communicatively couple to the mobile device 118 of the user 120.

The vehicle 100 of the illustrated example also includes an autonomy unit 122 that performs autonomous and/or semi-autonomous driving maneuvers for the vehicle 100, such as trailer backup-assist and/or remote park-assist. For example, the autonomy unit 122 performs the autonomous and/or semi-autonomous motive functions based upon, at least in part, image(s) and/or video captured by the camera 110 and/or the camera 114, data collected by the proximity sensor 108 and/or the proximity sensor 112, and/or instructions received from the mobile device 118.

In the illustrated example, the vehicle 100 includes a vehicle-assist controller 124 that operates a remote-assist app on the mobile device 118 to enable the user 120 to initiate remote park-assist and/or remote trailer backup assist features of the vehicle 100. Additionally or alternatively, the mobile device 118 is configured to include the vehicle-assist controller 124. For example, the vehicle-assist controller 124 presents an interface via a touchscreen (e.g., a touchscreen 1006 of FIG. 10) of the mobile device 118 upon the user 120 activating the app on the mobile device 118.

If the vehicle-assist controller 124 identifies that the trailer 102 is coupled to the vehicle 100, the vehicle-assist controller 124 presents an interface (e.g., a first interface) to operate trailer backup-assist. For example, the vehicle-assist controller 124 presents an interface for trailer backup-assist in response to receiving a signal indicating that the hitch sensor 106, the proximity sensor 108, and/or the camera 110 detects that the trailer 102 is coupled to the hitch 104 of the vehicle 100. When the interface for the trailer backup-assist is presented via the mobile device 118, the vehicle-assist controller 124 detects when the user 120 provides a swipe (also referred to as a swipe input, a swiping motion, a swiping motion input) along the touchscreen of the mobile device 118. Upon detecting the swipe, the vehicle-assist controller 124 instructs, via a communication module of the mobile device 118 (e.g., a communication module 1008 of FIG. 10), the autonomy unit 122 of the vehicle 100 to perform the trailer backup-assist by moving in a direction that corresponds to the swipe. Further, the vehicle-assist controller 124 continues to instruct the autonomy unit 122 of the vehicle 100 to move in the direction while detecting a continuous motion (e.g., a continuous orbital motion) extending from the swipe. That is, the vehicle-assist controller 124 instructs the vehicle 100 to perform the trailer backup-assist as long as the touchscreen of the mobile device 118 detects a continuous input motion that includes a swipe and an orbital motion (e.g., a circular motion) extending from the swipe. Additionally, the vehicle-assist controller 124 instructs the vehicle 100 to stop moving in response to detecting that the continuous input motion has stopped (e.g., due to the user 120 removing his or her finger from the touchscreen, the user 120 keeping his or her finger stationary on the touchscreen, communication lag between the communication module 116 and the mobile device 118, etc.). That is, the vehicle-assist controller 124 instructs the vehicle 100 to stop moving in response to detecting that the continuous orbital motion has stopped and/or the swipe has stopped before transitioning to the continuous orbital motion.

Further, if the vehicle-assist controller 124 identifies that the trailer 102 is not coupled to the vehicle 100, the vehicle-assist controller 124 presents an interface (e.g., a second interface) to operate remote park-assist. For example, the vehicle-assist controller 124 presents an interface for remote park-assist in response to receiving a signal indicating that the hitch sensor 106, the proximity sensor 108, and/or the camera 110 detects that the trailer 102 is not coupled to the hitch 104 of the vehicle 100. When the interface for the remote park-assist is presented via the mobile device 118, the vehicle-assist controller 124 detects when the user 120 provides an input via the touchscreen of the mobile device 118. Upon detecting the input via the touchscreen, the vehicle-assist controller 124 instructs, via a communication module of the mobile device 118, the autonomy unit 122 of the vehicle 100 to perform the remote park-assist motive functions.

Figure 2:
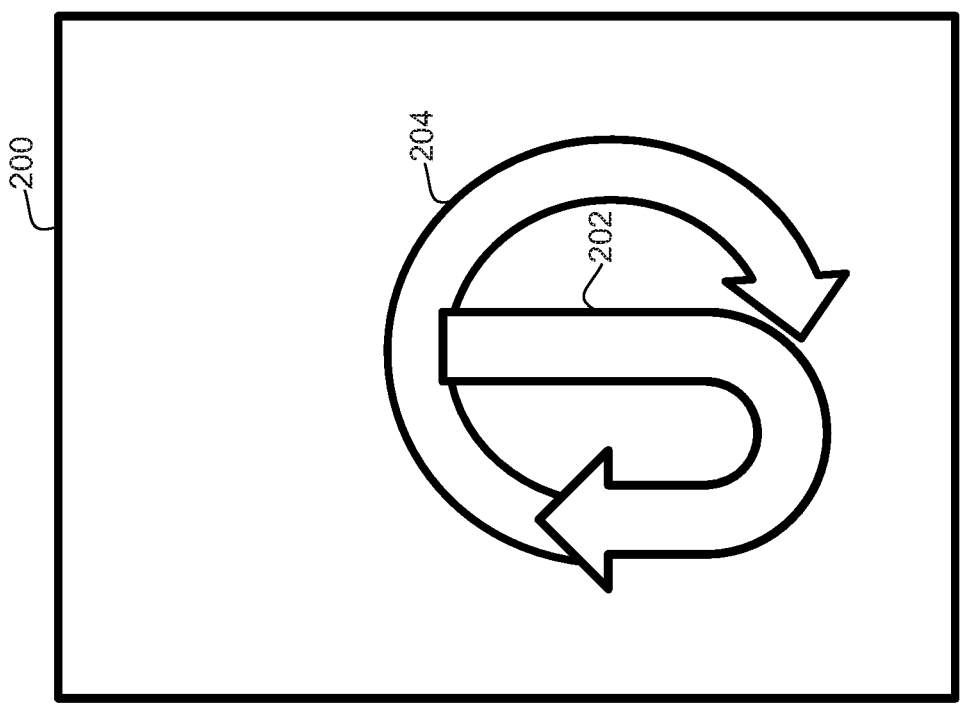
FIG. 2 illustrates an example interface presented via the mobile device of FIG. 1 for trailer backup-assist.

FIG. 2 illustrates an example interface 200 presented via the mobile device 118 for remote trailer backup-assist. The interface 200 depicts user input received via a touchscreen (e.g., a touchscreen 1006 of FIG. 10) of the mobile device 118. For example, the user 120 interacts with the touchscreen of the mobile device 118 by drawing a path on the touchscreen via a finger, a stylus, etc. As illustrated in FIG. 2, the user input includes a swipe 202 and a continuous motion 204 extending from the swipe 202. For example, the vehicle-assist controller 124 presents the swipe 202 and the continuous motion 204 via the interface 200 upon detecting a corresponding path drawn on the touchscreen via the user 120. In the illustrated example, the swipe 202 is a downward swipe motion, and the continuous motion 204 is a continuous orbital (e.g., circular) motion in a clockwise direction. Alternatively, the continuous motion 204 may be a continuous orbital motion in a counterclockwise direction.

In operation, the vehicle-assist controller 124 continuously instructs the vehicle 100 to move backward in a straight path for the trailer backup-assist while the touchscreen of the mobile device 118 continuously detects the swipe 202 and/or the continuous motion 204. That is, the vehicle-assist controller 124 instructs the autonomy unit 122 to cause a straight backward movement of the vehicle 100 in response to detecting a downward swipe and/or an orbital motion extending from the downward swipe as a continuous motion. Further, the vehicle-assist controller 124 instructs the vehicle 100 to stop movement in response to the touchscreen detecting a stop and/or break in the swipe 202 and/or the continuous motion 204.

Figure 3:
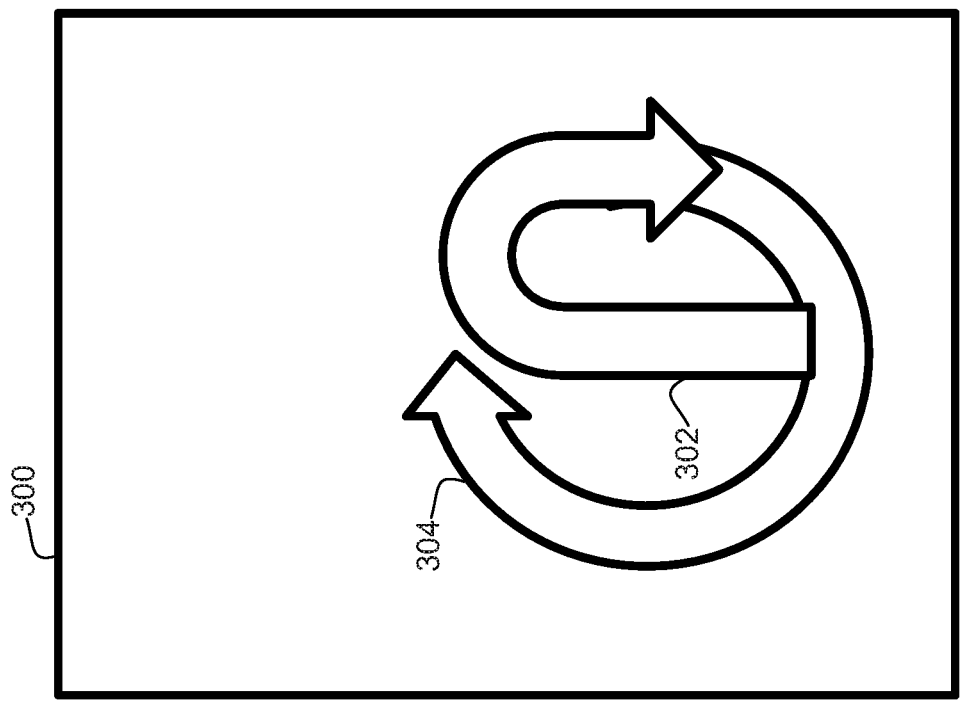
FIG. 3 illustrates another example interface presented via the mobile device of FIG. 1 for trailer backup-assist.

FIG. 3 illustrates another example interface 300 presented via the mobile device 118 for remote trailer backup-assist. The interface 300 depicts user input received via a touchscreen (e.g., a touchscreen 1006 of FIG. 10) of the mobile device 118. As illustrated in FIG. 3, the user input includes a swipe 302 and a continuous motion 304 extending from the swipe 302. For example, the vehicle-assist controller 124 presents the swipe 302 and the continuous motion 304 via the interface 300 upon detecting a corresponding path drawn on the touchscreen via the user 120 as a user input. In the illustrated example, the swipe 302 is an upward swipe motion, and the continuous motion 304 is a continuous orbital (e.g., circular) motion in a clockwise direction. Alternatively, the continuous motion 304 may be a continuous orbital motion in a counterclockwise direction.

In operation, the vehicle-assist controller 124 continuously instructs the vehicle 100 to move forward in a straight path for the trailer backup-assist while the touchscreen of the mobile device 118 continuously detects the swipe 302 and/or the continuous motion 304. That is, the vehicle-assist controller 124 instructs the autonomy unit 122 to cause straight forward movement of the vehicle 100 in response to detecting an upward swipe and/or an orbital motion extending from the upward swipe as a continuous motion. Further, the vehicle-assist controller 124 instructs the vehicle 100 to stop movement in response to the touchscreen detecting a stop and/or break in the swipe 302 and/or the continuous motion 304.

Figure 4:
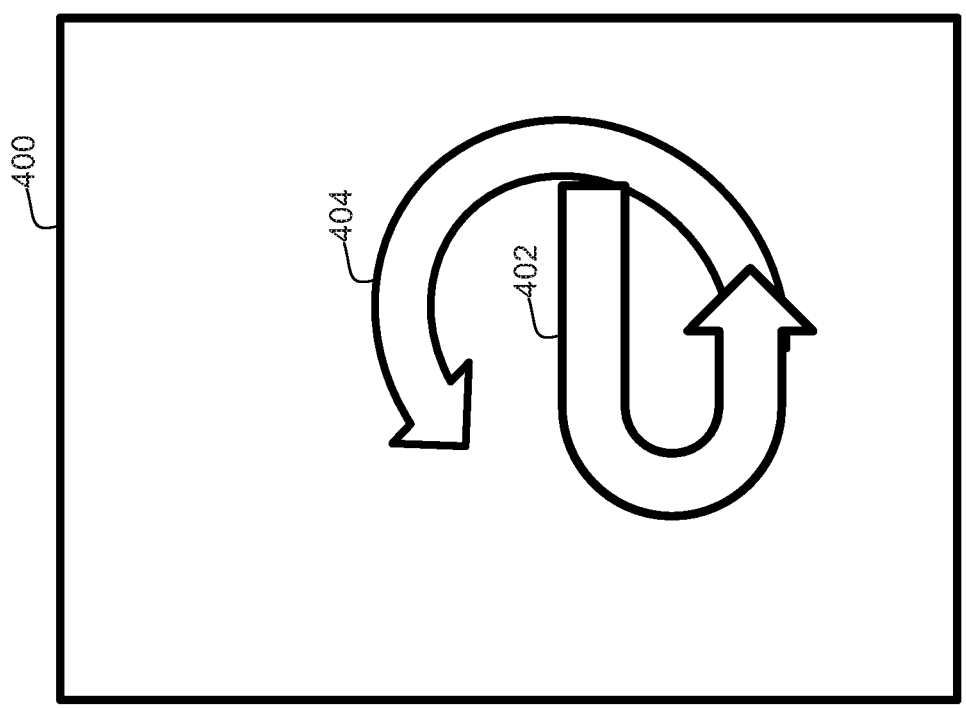
FIG. 4 illustrates another example interface presented via the mobile device of FIG. 1 for trailer backup-assist.

FIG. 4 illustrates another example interface 400 presented via the mobile device 118 for remote trailer backup-assist. The interface 400 depicts user input received via a touchscreen (e.g., a touchscreen 1006 of FIG. 10) of the mobile device 118. As illustrated in FIG. 4, the user input includes a swipe 402 and a continuous motion 404 extending from the swipe 402. For example, the vehicle-assist controller 124 presents the swipe 402 and the continuous motion 404 via the interface 400 upon detecting a corresponding path drawn on the touchscreen via the user 120 as a user input. In the illustrated example, the swipe 402 is a leftward swipe motion, and the continuous motion 404 is a continuous orbital (e.g., circular) motion in a counterclockwise direction. Alternatively, the continuous motion 404 may be a continuous orbital motion in a clockwise direction.

In operation, the vehicle-assist controller 124 continuously instructs the vehicle 100 to turn left for the trailer backup-assist while the touchscreen of the mobile device 118 continuously detects the swipe 402 and/or the continuous motion 404. That is, the vehicle-assist controller 124 instructs the autonomy unit 122 to cause the vehicle 100 to turn left in response to detecting a leftward swipe and/or an orbital motion extending from the leftward swipe as a continuous motion. Further, the vehicle-assist controller 124 instructs the autonomy unit 122 to cause the vehicle 100 to turn left while moving in reverse in response to determining that the vehicle is currently and/or was most recently moving in reverse before starting the turning motion. The vehicle-assist controller 124 instructs the autonomy unit 122 to cause the vehicle 100 to turn left while moving forward in response to determining that the vehicle is currently and/or was most recently moving forward before starting the turning motion. Additionally, the vehicle-assist controller 124 instructs the vehicle 100 to stop movement in response to the touchscreen detecting a stop and/or break in the swipe 402 and/or the continuous motion 404.

Figure 5:
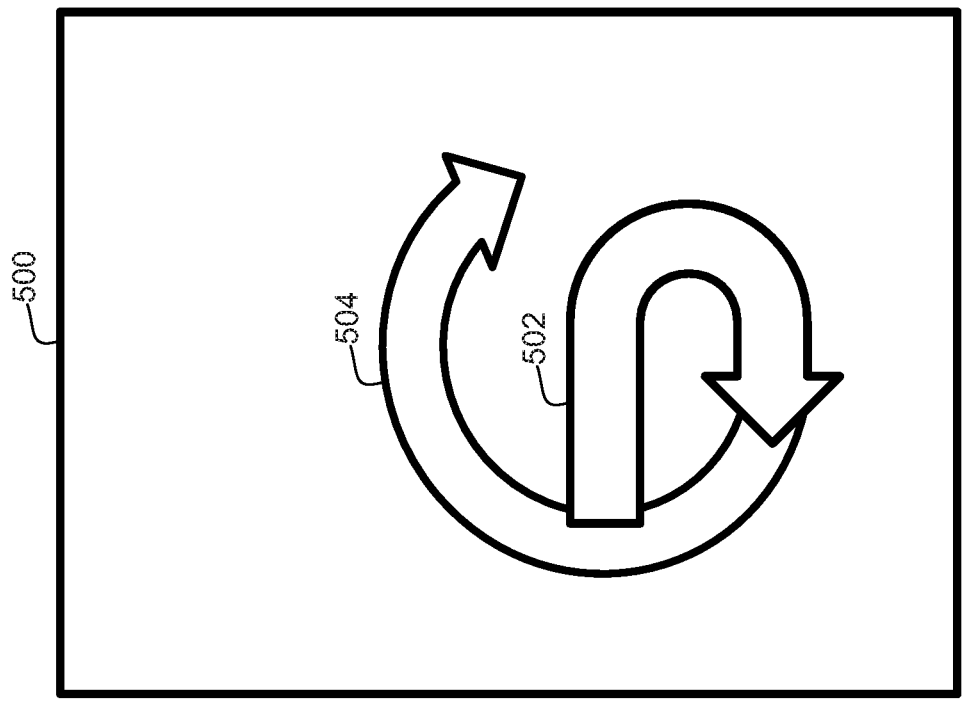
FIG. 5 illustrates another example interface presented via the mobile device of FIG. 1 for trailer backup-assist.

FIG. 5 illustrates another example interface 500 presented via the mobile device 118 for remote trailer backup-assist. The interface 500 depicts user input received via a touchscreen (e.g., a touchscreen 1006 of FIG. 10) of the mobile device 118. As illustrated in FIG. 5, the user input includes a swipe 502 and a continuous motion 504 extending from the swipe 502. For example, the vehicle-assist controller 124 presents the swipe 502 and the continuous motion 504 via the interface 500 upon detecting a corresponding path drawn on the touchscreen via the user 120 as a user input. In the illustrated example, the swipe 502 is a rightward swipe motion, and the continuous motion 504 is a continuous orbital (e.g., circular) motion in a clockwise direction. Alternatively, the continuous motion 404 may be a continuous orbital motion in a counterclockwise direction.

In operation, the vehicle-assist controller 124 continuously instructs the vehicle 100 to turn right for the trailer backup-assist while the touchscreen of the mobile device 118 continuously detects the swipe 502 and/or the continuous motion 504. That is, the vehicle-assist controller 124 instructs the autonomy unit 122 to cause the vehicle 100 to turn right in response to detecting a rightward swipe and/or an orbital motion extending from the rightward swipe as a continuous motion. Further, the vehicle-assist controller 124 instructs the autonomy unit 122 to cause the vehicle 100 to turn left while moving in reverse in response to determining that the vehicle is currently and/or was most recently moving in reverse before starting the turning motion. The vehicle-assist controller 124 instructs the autonomy unit 122 to cause the vehicle 100 to turn left while moving forward in response to determining that the vehicle is currently and/or was most recently moving forward before starting the turning motion. Additionally, the vehicle-assist controller 124 instructs the vehicle 100 to stop movement in response to the touchscreen detecting a stop and/or break in the swipe 502 and/or the continuous motion 504.

Figure 6:
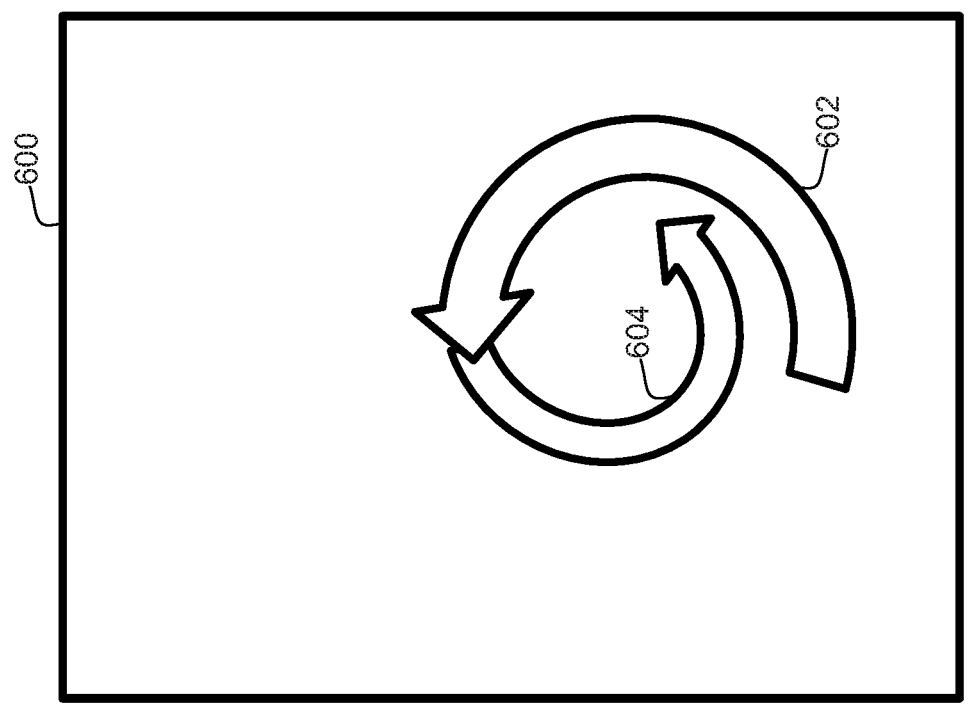
FIG. 6 illustrates another example interface presented via the mobile device of FIG. 1 for trailer backup-assist.

FIG. 6 illustrates another example interface 600 presented via the mobile device 118 for remote trailer backup-assist. The interface 600 depicts user input received via a touchscreen (e.g., a touchscreen 1006 of FIG. 10) of the mobile device 118. As illustrated in FIG. 6, the user input includes a continuous motion that includes a first portion 602 (e.g., a first continuous motion portion, an outer continuous motion portion) and a second portion 604 (e.g., a second continuous motion portion, an inner continuous motion portion) extending from the first portion 602. For example, the first portion 602 is a portion of the continuous motion that extends from a sideways swipe that initiates a turning motion for the vehicle (e.g., the swipe 402 that initiates a left turn, the swipe 502 that initiates a right turn). As illustrated in FIG. 6, the first portion 602 of the user input has a greater radius than that of the second portion 604 such that the continuous motion forms a corkscrew pattern with a decreasing radius. For examples, the vehicle-assist controller 124 presents the first portion 602 and the second portion 604 of the continuous motion via the interface 600 upon detecting a corresponding path drawn on the touchscreen via the user 120 as a user input. In the illustrated example, the first portion 602 and the second portion 604 of the continuous motion extend in a counterclockwise direction. Alternatively, the first portion 602 and the second portion 604 may extend in a clockwise direction.

In operation, the vehicle-assist controller 124 instructs the autonomy unit 122 to adjust the turning radius of the vehicle 100 based on the first portion 602 and the second portion 604. That is, because the turning radius of the vehicle 100 corresponds to the continuous motion provided by the user 120, the vehicle-assist controller 124 instructs the vehicle 100 to adjust a turning radius in response to detecting a change in radius of the continuous motion. In the illustrated example, the second portion 604 of the continuous motion has a smaller radius than that of the first portion 602 of the continuous motion. In turn, the vehicle-assist controller 124 instructs the autonomy unit 122 to reduce the turning radius of the vehicle 100 as the continuous motion transitions from the first portion 602 to the second portion 604.

Figure 7:
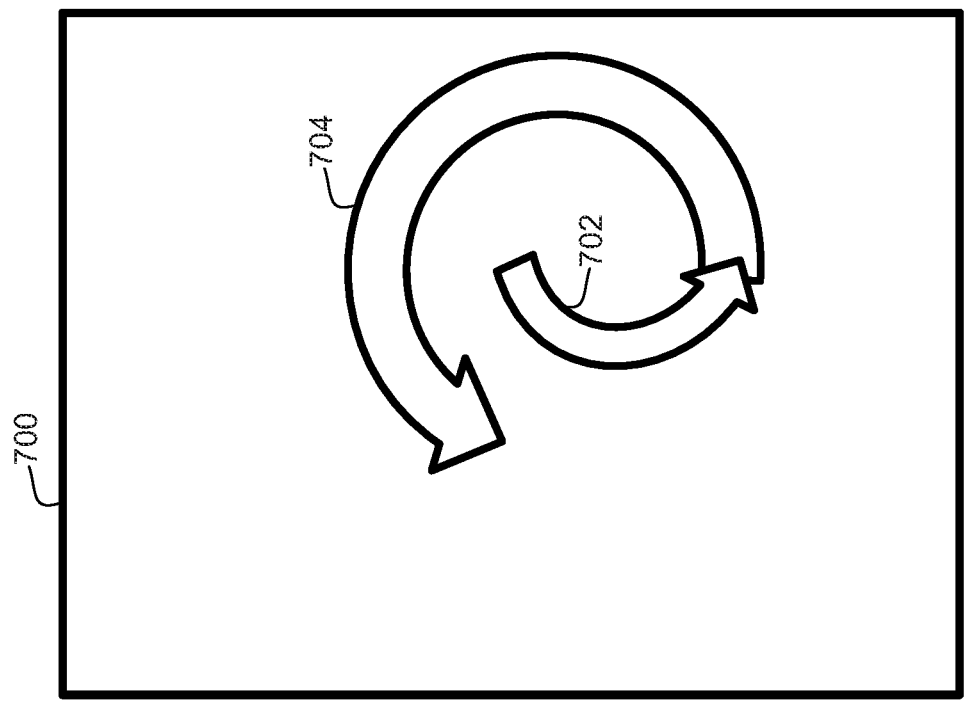
FIG. 7 illustrates another example interface presented via the mobile device of FIG. 1 for trailer backup-assist.

FIG. 7 illustrates another example interface 700 presented via the mobile device 118 for remote trailer backup-assist. The interface 700 depicts user input received via a touchscreen (e.g., a touchscreen 1006 of FIG. 10) of the mobile device 118. As illustrated in FIG. 7, the user input includes a continuous motion that includes a first portion 702 (e.g., a first continuous motion portion, an inner continuous motion portion) and a second portion 704 (e.g., a second continuous motion portion, an outer continuous motion portion) extending from the first portion 702. For example, the first portion 702 is a portion of the continuous motion that extends from a sideways swipe that initiates a turning motion for the vehicle (e.g., the swipe 402 that initiates a left turn, the swipe 502 that initiates a right turn). As illustrated in FIG. 7, the first portion 702 of the user input has a smaller radius than that of the second portion 704 such that the continuous motion forms a corkscrew pattern with a increasing radius. For examples, the vehicle-assist controller 124 presents the first portion 702 and the second portion 704 of the continuous motion via the interface 700 upon detecting a corresponding path drawn on the touchscreen via the user 120 as a user input. In the illustrated example, the first portion 702 and the second portion 704 of the continuous motion extend in a counterclockwise direction. Alternatively, the first portion 702 and the second portion 704 may extend in a clockwise direction.

In operation, the vehicle-assist controller 124 instructs the autonomy unit 122 to adjust the turning radius of the vehicle 100 based on the first portion 702 and the second portion 704. That is, because the turning radius of the vehicle 100 corresponds to the continuous motion provided by the user 120, the vehicle-assist controller 124 instructs the vehicle 100 to adjust a turning radius in response to detecting a change in radius of the continuous motion. In the illustrated example, the second portion 704 of the continuous motion has a larger radius than that of the first portion 702 of the continuous motion. In turn, the vehicle-assist controller 124 instructs the autonomy unit 122 to increase the turning radius of the vehicle 100 as the continuous motion transitions from the first portion 702 to the second portion 704.

Additionally or alternatively, the vehicle-assist controller 124 instructs the autonomy unit 122 to adjust a speed at which the vehicle 100 travels based on a speed of the user input that is detected via the touchscreen of the mobile device 118. That is, the vehicle-assist controller 124 instructs the autonomy unit 122 to adjust a vehicle speed of the vehicle 100 in response to detecting a change in speed at which the user 120 draws a swipe (e.g., the swipe 202, the swipe 302, the swipe 402, the swipe 502) and/or a continuous motion extending from a swipe (e.g., the continuous motion 204, the continuous motion 304, the continuous motion 404, the continuous motion 504, the first portion 602, the second portion 604, the first portion 702, the second portion 704) on the touchscreen of the mobile device 118. For example, the vehicle-assist controller 124 causes the vehicle 100 to accelerate in response to detecting that user 120 is providing the input on the touchscreen at an accelerated rate and/or causes the vehicle 100 to decelerate in response to detecting that user 120 is providing the input on the touchscreen at a decelerated rate.

Figure 8:
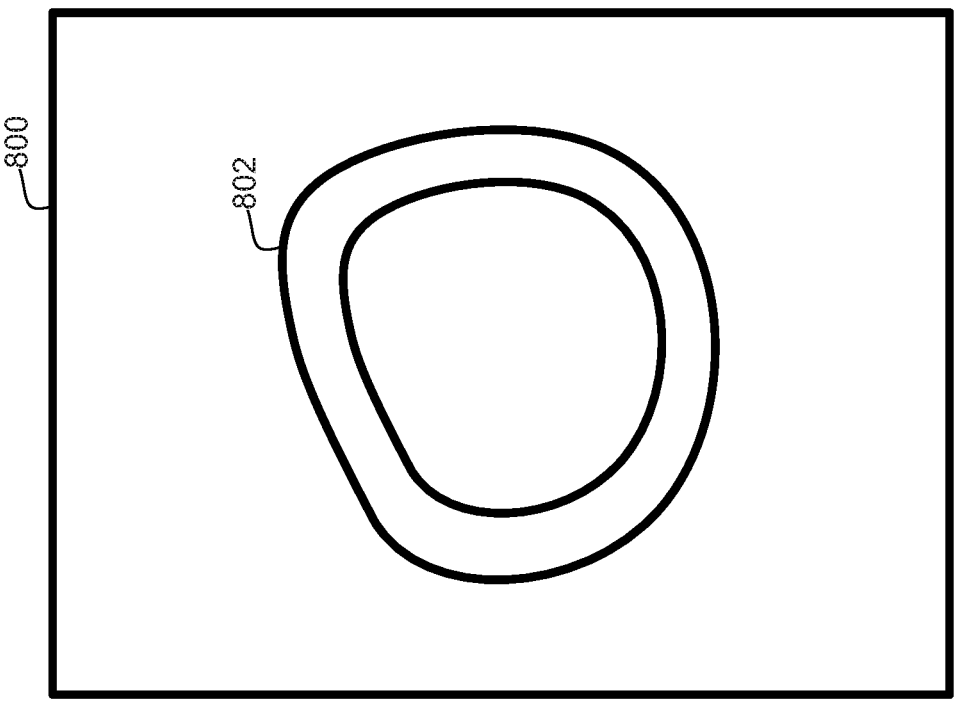
FIG. 8 illustrates another example interface presented via the mobile device of FIG. 1 for trailer backup-assist and/or remote park-assist.

FIG. 8 illustrates another example interface 800 presented via the touchscreen of the mobile device 118. The interface 800 includes a motion track 802 in which the user 120 is to draw a continuous motion to instruct the autonomy unit 122 to move the vehicle 100. For example, the vehicle-assist controller 124 presents the interface 800 including the motion track 802 for remote park-assist and/or remote trailer back-up assist. The vehicle-assist controller 124 sends an instruction to the autonomy unit 122 of the vehicle 100 to perform motive functions of the vehicle 100 for remote park-assist and/or remote trailer back-up assist in response to detecting that the user 120 is providing a continuous motion (e.g., a continuous orbital motion) on the touchscreen within the motion track 802. The vehicle-assist controller 124 sends an instruction to cause the vehicle 100 to stop moving in response to detecting that the continuous motion provided by the user 120 has stopped and/or broken. Further, vehicle-assist controller 124 sends an instruction to cause the vehicle 100 to stop moving in response to detecting that the continuous motion provided by the user 120 has extended outside of the motion track 802 of the interface 800.

Figure 9:
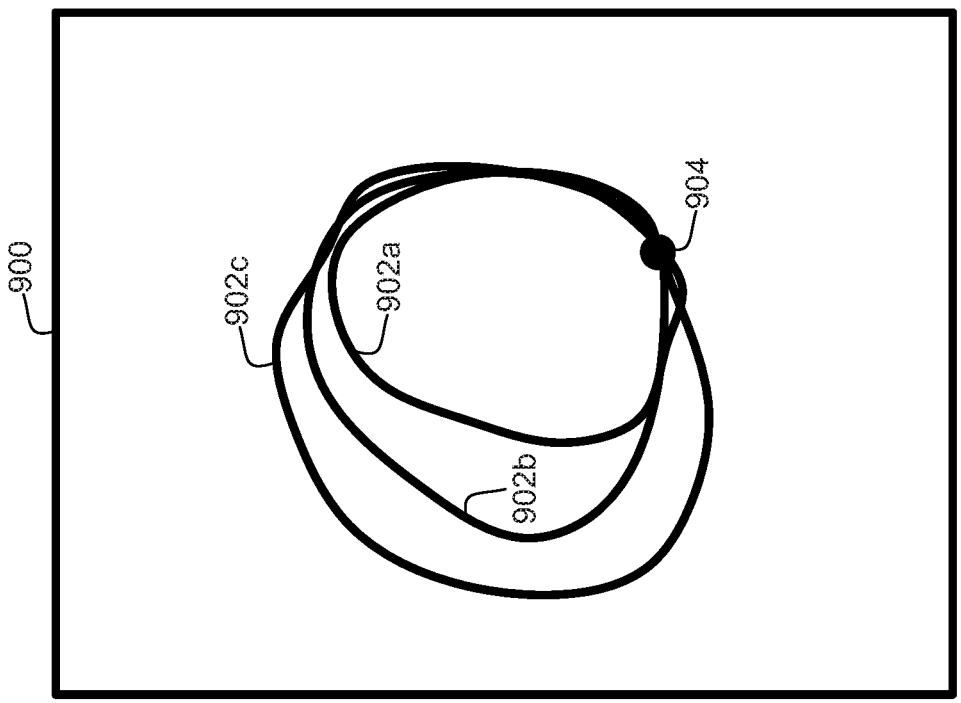
FIG. 9 illustrates another example interface presented via the mobile device of FIG. 1 for trailer backup-assist and/or remote park-assist.

FIG. 9 illustrates another example interface 900 presented via the touchscreen of the mobile device 118. The interface 900 includes a plurality of motion paths 902 that are received from the user 120 via the touchscreen of the mobile device 118 and are utilized to define a location and a shape of the motion track 802 of the interface 800. For example, to enable the user 120 to define the shape and the location of the motion track 802 for the interface 800, the user 120 draws a first motion path 902*a*, a second motion path 902*b*, and a third motion path 902*c*. In the illustrated example, the touchscreen of the mobile device 118 detects the first motion path 902*a*, the second motion path 902*b*, and the third motion path 902*c* that the user 120 provides in one continuous motion starting at an initial point 904. The vehicle-assist controller 124 determines the motion track 802 of the interface 800 based on the location and shape of each of the motion paths 902 of the interface 900 (e.g., by averaging the location and/or the shape of the motion paths 902 together). In some examples, a variance between the motion paths 902 is utilized to determine a width of the motion track 802. For example, the width of the motion track 802 is smaller the more similar the shape and the location of each of the motion paths 902 are to each other, and the width of the motion track 802 is larger the less similar the shape and the location of each of the motion paths 902 are to each other.

FIG. 10 is a block diagram of electronic components 1000 of the mobile device 118. As illustrated in FIG. 10, the electronic components 1000 include a controller or processor 1002, memory 1004, a touchscreen 1006, and a communication module 1008.

In the illustrated example, the processor 1002 is structured to include the vehicle-assist controller 124. The processor 1002 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 1004 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 1004 includes multiple kinds of memory, particularly volatile memory and non-volatile memory.

The memory 1004 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 1004, the computer readable medium, and/or within the processor 1002 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The touchscreen 1006 of the illustrated example provides an interface between the user 120 and the mobile device 118 to enable the user 120 to utilize trailer backup-assist and/or remote park-assist for the vehicle 100. For example, the touchscreen 1006 is a resistive touchscreen, a capacitive touchscreen, and/or any other type of touchscreen that displays output information to and tactilely receives input information from the user 120 of the mobile device 118. In some examples, the electronic components 1000 of the mobile device 118 also includes other input devices (e.g., buttons, knobs, microphones, etc.) and/or output devices (e.g., speakers, LEDs, etc.) to receive input information from and/or provide output information to the user 120 of the mobile device 118. The user 120 interacts with the touchscreen 1006 to utilize trailer backup-assist and/or remote park-assist via the mobile device 118. Based on input received from the user 120 via the touchscreen 1006, the communication module 1008 of the mobile device 118 wirelessly communicates with the communication module 116 of the vehicle 100 to initiate motive functions of the vehicle 100 for trailer backup-assist and/or remote park-assist.

Further, the communication module 1008 includes wired or wireless network interfaces to enable communication with other devices and/or external networks. The external network(s) may be a public network, such as the Internet; a private network, such as an intranet; or combinations thereof, and may utilize a variety of networking protocols now available or later developed including, but not limited to, TCP/IP-based networking protocols. The communication module 1008 also includes hardware (e.g., processors, memory, storage, antenna, etc.) and software to control the wired or wireless network interfaces. For example, the communication module 1008 includes one or more communication controllers for cellular networks, such as Global System for Mobile Communications (GSM), Universal Mobile Telecommunications System (UMTS), Long Term Evolution (LTE), Code Division Multiple Access (CDMA). In the illustrated example, the communication module 1008 includes a wireless personal area network (WPAN) module that is configured to wirelessly communicate with the communication module 116 of the vehicle 100 via short-range wireless communication protocol(s). In some examples, the communication module 1008 implements the Bluetooth® and/or Bluetooth® Low Energy (BLE) protocols. The Bluetooth® and BLE protocols are set forth in Volume 6 of the Bluetooth® Specification 4.0 (and subsequent revisions) maintained by the Bluetooth® Special Interest Group. Additionally or alternatively, the communication module 1008 is configured to wirelessly communicate via Wi-Fi®, Near Field Communication (NFC), UWB (Ultra-Wide Band), and/or any other short-range and/or local wireless communication protocol (e.g., IEEE 802.11a/b/g/n/ac) that enables the communication module 1008 to communicatively couple to the communication module 116 of the vehicle 100.

Figure 11:
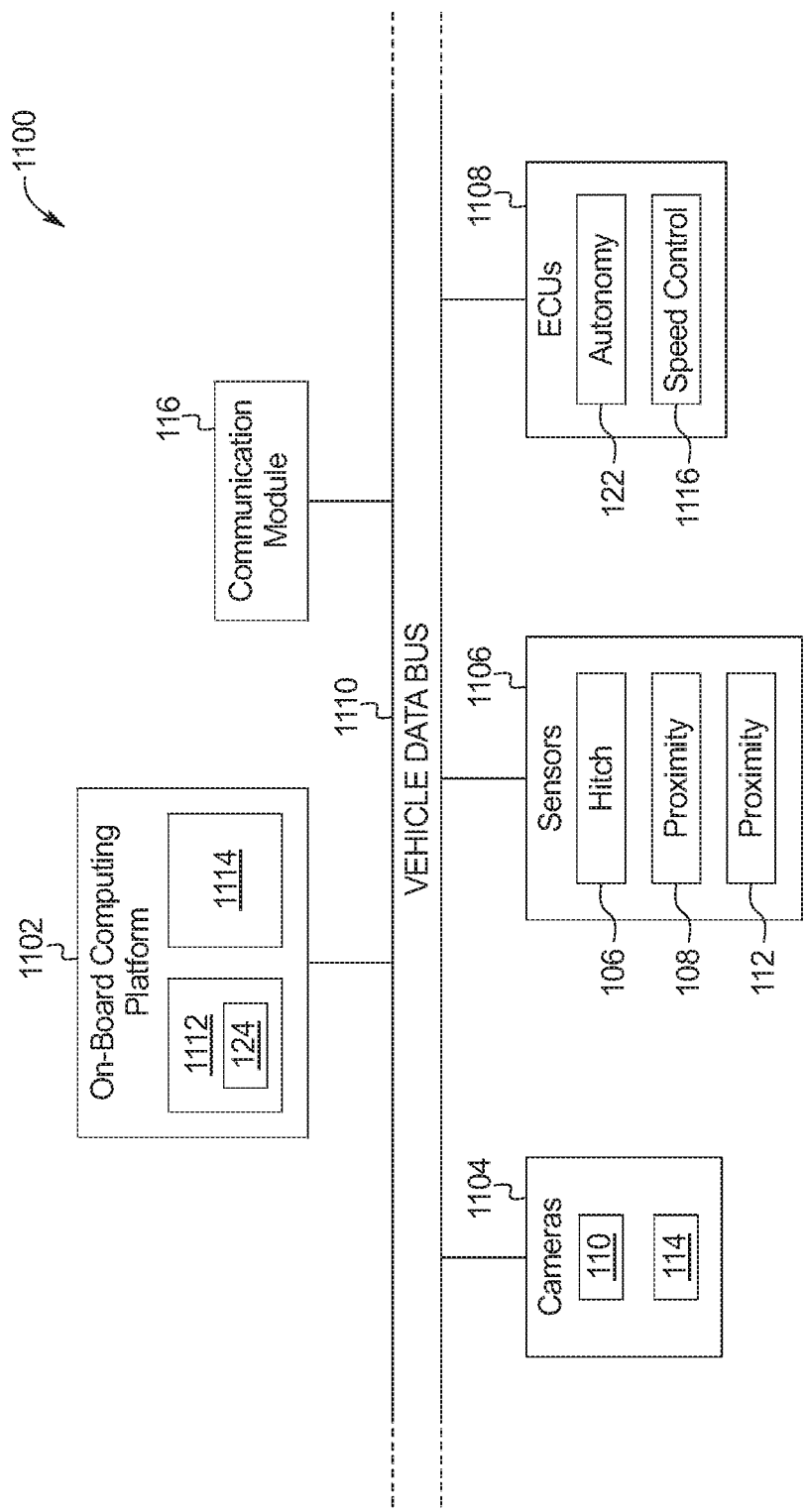
FIG. 11 is a block diagram of electronic components of the vehicle of FIG. 1.

FIG. 11 is a block diagram of electronic components 1100 of the vehicle 100. As illustrated in FIG. 11, the electronic components 1100 include an on-board computing platform 1102, the communication module 116, cameras 1104, sensors 1106, electronic control units (ECUs) 1108, and a vehicle data bus 1110.

The on-board computing platform 1102 includes a microcontroller unit, controller or processor 1112 and memory 1114. In some examples, the processor 1112 of the on-board computing platform 1102 is structured to include the vehicle-assist controller 124. Alternatively, in some examples, the vehicle-assist controller 124 is incorporated into another electronic control unit (ECU) with its own processor 1112 and memory 1114. The processor 1112 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 1114 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 1114 includes multiple kinds of memory, particularly volatile memory and non-volatile memory.

The memory 1114 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 1114, the computer readable medium, and/or within the processor 1112 during execution of the instructions.

The cameras 1104 of the illustrated example collect image(s) and/or video of a surrounding area of the vehicle 100. For example, the cameras 1104 capture image(s) and/or video that are utilized by the autonomy unit 122 to facilitate performance of autonomous and/or semi-autonomous driving maneuvers of the vehicle 100. As illustrated in FIG. 3, the cameras 1104 include the camera 110 and the camera 114. The camera 110 collects image(s) and/or video of an area behind the vehicle 100, and the camera 114 collects image(s) and/or video of an area in front of the vehicle 100.

The sensors 1106 are arranged in and around the vehicle 100 to monitor properties of the vehicle 100 and/or an environment in which the vehicle 100 is located. One or more of the sensors 1106 may be mounted to measure properties around an exterior of the vehicle 100. Additionally or alternatively, one or more of the sensors 1106 may be mounted inside a cabin of the vehicle 100 or in a body of the vehicle 100 (e.g., an engine compartment, wheel wells, etc.) to measure properties in an interior of the vehicle 100. For example, the sensors 1106 include accelerometers, odometers, tachometers, pitch and yaw sensors, wheel speed sensors, microphones, tire pressure sensors, biometric sensors and/or sensors of any other suitable type.

In the illustrated example, the sensors 1106 include the hitch sensor 106, the proximity sensor 108, and the proximity sensor 112. The hitch sensor 106 detects whether the trailer 102 is coupled to the vehicle 100 via the hitch 104. The proximity sensor 108 monitors an area behind the vehicle 100 to detect a presence of, a location of, and/or a distance to an object (e.g., the trailer 102) behind the vehicle 100. Further, the proximity sensor 112 monitors an area in front of the vehicle 100 to detect a presence of, a location of, and/or a distance to an object in front of the vehicle 100. Proximity sensors (e.g., the proximity sensor 108, the proximity sensor 112) include a radar sensor that detects and locates an object via radio waves, a lidar sensor that detects and locates the object via lasers, an ultrasonic sensor that detects and locates the object via ultrasound waves, and/or any other type of sensor that is configured to detect and locate a nearby object.

The ECUs 1108 monitor and control the subsystems of the vehicle 100. For example, the ECUs 1108 are discrete sets of electronics that include their own circuit(s) (e.g., integrated circuits, microprocessors, memory, storage, etc.) and firmware, sensors, actuators, and/or mounting hardware. The ECUs 1108 communicate and exchange information via a vehicle data bus (e.g., the vehicle data bus 1110). Additionally, the ECUs 1108 may communicate properties (e.g., status of the ECUs 1108, sensor readings, control state, error and diagnostic codes, etc.) to and/or receive requests from each other. For example, the vehicle 100 may have seventy or more of the ECUs 1108 that are positioned in various locations around the vehicle 100 and are communicatively coupled by the vehicle data bus 1110. In the illustrated example, the ECUs 1108 include the autonomy unit 122 and a speed control unit 1116. For example, the autonomy unit 122 controls performance of autonomous and/or semi-autonomous driving maneuvers of the vehicle 100 based upon, at least in part, image(s) and/or video captured by the cameras 1104, data collected by the sensors 1106, and/or instructions received from the mobile device 118. The speed control unit 1116 autonomously and/or semi-autonomously controls a speed at which the vehicle 100 moves, for example, based upon instructions received from the mobile device 118.

The vehicle data bus 1110 communicatively couples the communication module 116, the on-board computing platform 1102, the cameras 1104, the sensors 1106, and the ECUs 1108. In some examples, the vehicle data bus 1110 includes one or more data buses. The vehicle data bus 1110 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 12:
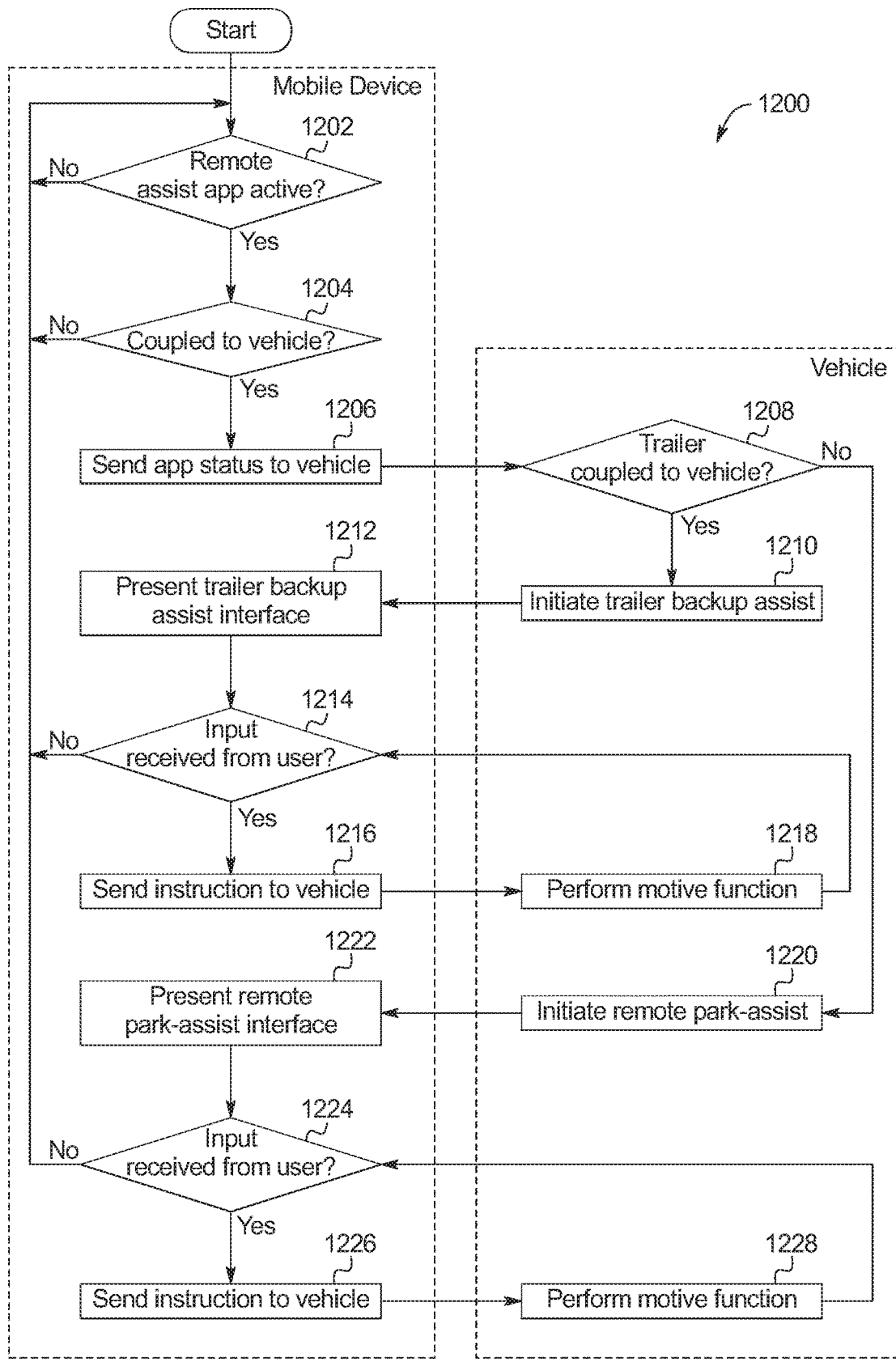
FIG. 12 is a flowchart for initiating trailer backup-assist and remote park-assist in accordance with the teachings herein.

FIG. 12 is a flowchart of an example method 1200 to initiate trailer backup-assist and remote park-assist in accordance with the teachings herein. The flowchart of FIG. 12 is representative of machine readable instructions that are stored in memory (such as the memory 1114 of FIG. 11) and include one or more programs which, when executed by a processor (such as the processor 1112 of FIG. 11), cause the vehicle 100 to implement the example processor 1002 of FIG. 10 and/or the example vehicle-assist controller 124 of FIGS. 1 and 11. While the example program is described with reference to the flowchart illustrated in FIG. 12, many other methods of implementing the example processor 1002 and/or the example vehicle-assist controller 124 may alternatively be used. For example, the order of execution of the blocks may be rearranged, changed, eliminated, and/or combined to perform the method 1200. Further, because the method 1200 is disclosed in connection with the components of FIGS. 1-11, some functions of those components will not be described in detail below.

Initially, at block 1202, the vehicle-assist controller 124 determines whether a remote-assist app is active on the mobile device 118. In response to the vehicle-assist controller 124 determining that the remote-assist app is inactive, the method 1200 remains at block 1202. Otherwise, in response to the vehicle-assist controller 124 determining that the remote-assist app is active, the method 1200 proceeds to block 1204.

At block 1204, the vehicle-assist controller 124 determines whether the mobile device 118 is communicatively coupled to the vehicle 100. For example, the vehicle-assist controller 124 determines whether the communication module 1008 of the mobile device 118 is wirelessly coupled to the communication module 116 of the vehicle 100. In response to the vehicle-assist controller 124 determining that the mobile device 118 and the vehicle 100 are not communicatively coupled, the method 1200 returns to block 1202. Otherwise, in response to the vehicle-assist controller 124 determining that the mobile device 118 and the vehicle 100 are communicatively coupled, the method 1200 proceeds to block 1206. At block 1206, the vehicle-assist controller 124 sends an app status to the vehicle 100 indicating that the remote-assist app of the mobile device 118 is activated for use by the user 120. For example, the vehicle-assist controller 124 sends the app status from the communication module 1008 of the mobile device 118 to the communication module 116 of the vehicle 100.

At block 1208, the hitch sensor 106, the proximity sensor 108, the camera 110, and/or any other sensor or camera of the vehicle 100 detects whether the trailer 102 is coupled to the hitch 104 of the vehicle 100. In response to a sensor and/or camera detecting that the trailer 102 is coupled to the vehicle 100, the method 1200 proceeds block 1210.

At block 1210, the autonomy unit 122 initiates remote trailer backup-assist for the vehicle 100. Further, the communication module 116 of the vehicle 100 sends a signal to the communication module 1008 of the mobile device 118 that indicates that remote trailer backup-assist has been initiated for the vehicle 100. At block 1212, the vehicle-assist controller 124 presents a trailer backup-assist interface (e.g., the interface 200, the interface 300, the interface 400, the interface 500, the interface 600, the interface 700, the interface 800) via the touchscreen 1006 of the mobile device 118.

At block 1214, the vehicle-assist controller 124 determines whether the touchscreen 1006 has received a continuous motion input, including a swipe (e.g., the swipe 202, the swipe 302, the swipe 402, the swipe 502) and/or a continuous motion extending from a swipe (e.g., the continuous motion 204, the continuous motion 304, the continuous motion 404, the continuous motion 504, the first portion 602, the second portion 604, the first portion 702, the second portion 704) from the user 120 of the mobile device 118. In response to the vehicle-assist controller 124 determining that the touchscreen 1006 is not receiving a continuous motion input, the method 1200 returns to block 1202. Otherwise, in response to the vehicle-assist controller 124 determining that the touchscreen 1006 is receiving a continuous motion input, the method 1200 proceeds to block 1216.

At block 1216, the vehicle-assist controller 124 sends, via the communication module 1008, an instruction to the communication module 116 to instruct the autonomy unit 122 of the vehicle 100 to perform motive functions for the remote trailer backup-assist in a direction that corresponds to the swipe input. At block 1218, the autonomy unit 122 performs the motive functions for the remote trailer backup-assist in the direction that corresponds to the swipe input. The method 1200 returns to block 1214 until continuous motion input detected by the touchscreen 1006 stops, brakes, and/or extends beyond a designation motion track (e.g., the motion track 802).

Returning to block 1208, the method 1200 proceeds to block 1220 in response to a vehicle sensor and/or camera detecting that the trailer 102 is not coupled to the vehicle 100. At block 1220, the autonomy unit 122 initiates remote park-assist for the vehicle 100. Further, the communication module 116 of the vehicle 100 sends a signal to the communication module 1008 of the mobile device 118 that indicates that remote park-assist has been initiated for the vehicle 100. At block 1222, the vehicle-assist controller 124 presents a remote park-assist interface (e.g., the interface 800) via the touchscreen 1006 of the mobile device 118.

At block 1224, the vehicle-assist controller 124 determines whether the touchscreen 1006 has received a continuous motion input from the user 120 of the mobile device 118. In response to the vehicle-assist controller 124 determining that the touchscreen 1006 is not receiving a continuous motion input, the method 1200 returns to block 1202. Otherwise, in response to the vehicle-assist controller 124 determining that the touchscreen 1006 is receiving a continuous motion input, the method 1200 proceeds to block 1226. At block 1226, the vehicle-assist controller 124 sends, via the communication module 1008, an instruction to the communication module 116 to instruct the autonomy unit 122 of the vehicle 100 to perform motive functions for the remote park-assist. At block 1228, the autonomy unit 122 performs the motive functions for the remote park-assist. The method 1200 returns to block 1224 until continuous motion input detected by the touchscreen 1006 stops, brakes, and/or extends beyond a designation motion track (e.g., the motion track 802).

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module," "unit," and "node" refer to hardware with circuitry to provide communication, control and/or monitoring capabilities, often in conjunction with sensors. A "module," a "unit," and a "node" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle system comprising:
a vehicle; and
a mobile device including:
a touchscreen;
a communication module; and
a controller to:
present, via the touchscreen, an interface for trailer backup-assist;
detect a swipe when the interface is presented;
determine a swipe direction of the swipe;
instruct, via the communication module, the vehicle to move in a direction corresponding to the swipe direction; and
continue to instruct the vehicle to move in the direction corresponding with the swipe direction while detecting a continuous orbital motion that is contiguous with and extends from the swipe, wherein a turning radius of the vehicle is based on the continuous orbital motion, wherein the continuous orbital motion comprises a first motion portion extending from the swipe, a second motion portion extending from the first motion portion, and a third motion portion extending from the second motion portion, radii of the first motion portion, the second motion portion, and the third motion portion being different.

2. The vehicle system of claim 1, wherein the vehicle includes a hitch, a hitch sensor configured to monitor the hitch, and a second communication module for wireless communication with the communication module of the mobile device.

3. The vehicle system of claim 2, wherein the controller presents the interface for the trailer backup-assist in response to receiving a signal indicating that the hitch sensor detects a trailer is coupled to the hitch of the vehicle.

4. The vehicle system of claim 2, wherein the controller presents a second interface for remote park-assist in response to receiving a signal indicating that the hitch sensor detects a trailer is not coupled to the hitch of the vehicle.

5. The vehicle system of claim 2, wherein the vehicle includes an autonomy unit and the controller instructs the autonomy unit to perform the trailer backup-assist in response to detecting a user input when the interface is presented.

6. A method comprising:
presenting, via a touchscreen of a mobile device, an interface for trailer backup-assist;
detecting a swipe on the touchscreen when the interface is presented;
instructing, via a communication module of the mobile device, a vehicle to move in a direction corresponding to the swipe; and
continuing to instruct the vehicle to move in the direction while detecting a continuous orbital motion that is contiguous with and extends from the swipe, wherein a turning radius of the vehicle is based on the continuous orbital motion, wherein the continuous orbital motion comprises a first motion portion extending from the swipe, a second motion portion extending from the first motion portion, and a third motion portion extending from the second motion portion, radii of the first motion portion, the second motion portion, and the third motion portion being different.

7. The method of claim 6, wherein the interface is presented in response to receiving a signal indicating that a trailer is coupled to the vehicle.

8. The method of claim 6, further including instructing the vehicle to stop moving in response to detecting that at least one of the continuous orbital motion has stopped and the swipe has stopped before transitioning to the continuous orbital motion.

9. The method of claim 6, further including instructing the vehicle to adjust a vehicle speed in response to detecting a change in speed of the continuous orbital motion.

10. The method of claim 6, further including instructing the vehicle to adjust the turning radius in response to detecting a continuous motion transition from the second motion portion to the third motion portion, the continuous motion transition corresponding to a continuous change from a radius of the second motion portion to the third motion portion.

11. The method of claim 6, wherein instructing the vehicle to move includes instructing:
straight forward movement in response to detecting an upward swipe;
straight reverse movement in response to detecting a downward swipe;
a left turn in response to detecting a leftward swipe; and
a right turn in response to detecting a rightward swipe.

12. The method of claim 6, further including presenting, via the touchscreen, a second interface for remote park-assist in response to receiving a signal indicating that a trailer is not coupled to the vehicle.

13. The method of claim 12, further including instructing an autonomy unit of the vehicle to perform the remote park-assist in response to detecting a user input when the second interface is presented.

14. The method of claim 6, further including instructing the vehicle to stop moving in response to detecting that the continuous orbital motion is outside of a motion track of the interface.

15. The method of claim 14, further including defining the motion track based upon a plurality of motion paths received from a user via the touchscreen.

16. A tangible computer readable medium including instructions which, when executed, cause a machine to:
present, via a touchscreen, an interface for trailer backup-assist;
detect a swipe on the touchscreen when the interface is presented;
determine a swipe direction of the swipe;
instruct, via a communication module, a vehicle to move in a direction corresponding to the swipe direction; and
continue to instruct the vehicle to move in the direction corresponding with the swipe direction while detecting a continuous orbital motion that is contiguous with and extends from the swipe, wherein a turning radius of the vehicle is based on the continuous orbital motion, wherein the continuous orbital motion comprises a first motion portion extending from the swipe, a second motion portion extending from the first motion portion, and a third motion portion extending from the second motion portion, radii of the first motion portion, the second motion portion, and the third motion portion being different.

17. The tangible computer readable medium of claim 16, wherein, the instructions, when executed, cause the machine to present the interface in response to receiving a signal indicating that a trailer is coupled to the vehicle.

18. The tangible computer readable medium of claim 16, wherein, the instructions, when executed, further cause the machine to instruct the vehicle to stop moving in response to detecting that at least one of the continuous orbital motion has stopped and the swipe has stopped before transitioning to the continuous orbital motion.

19. The tangible computer readable medium of claim 16, wherein, the instructions, when executed, further cause the machine to adjust a vehicle speed in response to detecting a change in speed of the continuous orbital motion.

20. The tangible computer readable medium of claim 16, wherein, the instructions, when executed, further cause the machine to adjust the turning radius in response to detecting a continuous motion transition from the second motion portion to the third motion portion, the continuous motion transition corresponding to a continuous change from a radius of the second motion portion to the third motion portion.

* * * * *